(12) United States Patent
Futamura

(10) Patent No.: US 10,823,281 B2
(45) Date of Patent: Nov. 3, 2020

(54) SPEED CONTROL DEVICE

(71) Applicant: AISIN SEIKI KABUSHIKI KAISHA, Kariya-shi, Aichi-ken (JP)

(72) Inventor: Suguru Futamura, Toyohashi (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 0 days.

(21) Appl. No.: 16/394,160

(22) Filed: Apr. 25, 2019

(65) Prior Publication Data

US 2019/0331214 A1  Oct. 31, 2019

(30) Foreign Application Priority Data

Apr. 27, 2018  (JP) .................................. 2018-086620
Apr. 27, 2018  (JP) .................................. 2018-087062

(51) Int. Cl.

| F16H 61/02 | (2006.01) |
|---|---|
| F16H 59/40 | (2006.01) |
| B60K 31/10 | (2006.01) |
| B60K 31/00 | (2006.01) |
| F16H 59/14 | (2006.01) |

(52) U.S. Cl.
CPC ......... *F16H 59/40* (2013.01); *B60K 31/0058* (2013.01); *B60K 31/107* (2013.01); *F16H 61/0213* (2013.01); *B60K 2031/0091* (2013.01); *F16H 2059/148* (2013.01); *F16H 2059/405* (2013.01)

(58) Field of Classification Search
None
See application file for complete search history.

(56) References Cited

U.S. PATENT DOCUMENTS

| 5,390,116 A | * | 2/1995 | Hayafune | ............... F16H 59/66 |
|---|---|---|---|---|
| | | | | 701/65 |
| 8,332,108 B2 | | 12/2012 | Kresse et al. | |
| 2010/0082208 A1 | | 4/2010 | Asai et al. | |
| 2012/0059571 A1 | * | 3/2012 | Yamada | ............ F16H 61/66272 |
| | | | | 701/112 |
| 2014/0365087 A1 | * | 12/2014 | Jeon | ..................... F16H 61/0204 |
| | | | | 701/51 |
| 2015/0066319 A1 | * | 3/2015 | Jeon | ..................... F16H 61/0213 |
| | | | | 701/58 |
| 2018/0274669 A1 | * | 9/2018 | Sasahara | ................. F16H 59/48 |

FOREIGN PATENT DOCUMENTS

| JP | 2010084867 A | 4/2010 |
|---|---|---|
| JP | 2013199961 A | 10/2013 |

* cited by examiner

*Primary Examiner* — Justin Holmes
(74) *Attorney, Agent, or Firm* — Buchanan Ingersoll & Rooney PC

(57) ABSTRACT

A speed control device includes: a vehicle information output unit that outputs at least two, as vehicle information, of measurement information on forward/backward acceleration of a vehicle measured by an acceleration sensor, forward/backward actual acceleration of the vehicle obtained from an output rotation of an automatic transmission, and a traveling driving force based on a driving force output by a driving source and an air resistance acting on the vehicle; and a setting unit that selects a shift mode by comparing the vehicle information with a predetermined selection threshold and sets a shift point for controlling the automatic transmission provided in the vehicle based on the shift mode.

3 Claims, 13 Drawing Sheets

SPEED CONTROL DEVICE

CROSS REFERENCE TO RELATED APPLICATIONS

This application is based on and claims priority under 35 U.S.C. § 119 to Japanese Patent Applications 2018-086620 and 2018-087062, both filed on Apr. 27, 2018, the entire contents of which are incorporated herein by reference.

TECHNICAL FIELD

This disclosure relates to a speed control device.

BACKGROUND DISCUSSION

A device for controlling gear positions of an automatic transmission provided in a vehicle is known. Such a device controls the automatic transmission by switching the gear positions at a shift point based on a gear shift map calculated from traveling resistance acting as resistance on the vehicle, for example.

JP 2013-199961A and JP 2010-084867A are examples of the related art.

However, the above device has a problem that it is difficult to set a shift point appropriately according to a situation of a vehicle including a vehicle weight, an inclination of a vehicle, or the like.

SUMMARY

A speed control device according to an aspect of this disclosure includes a vehicle information output unit that outputs at least two, as vehicle information, of measurement information on forward/backward acceleration of a vehicle measured by an acceleration sensor, forward/backward actual acceleration of the vehicle obtained from an output rotation of an automatic transmission, and a traveling driving force based on a driving force output by a driving source and an air resistance acting on the vehicle; and a setting unit that selects a shift mode by comparing the vehicle information with a predetermined selection threshold and sets a shift point for controlling the automatic transmission provided in the vehicle based on the shift mode.

A speed control device according to another aspect of this disclosure includes a vehicle information output unit that outputs, as vehicle information, measurement information on forward/backward acceleration of a vehicle measured by an acceleration sensor, forward/backward actual acceleration of the vehicle obtained from an output rotation of an automatic transmission, and a traveling driving force based on a driving force output by a driving source and an air resistance acting on the vehicle; and a setting unit that calculates traveling resistance from the vehicle information and sets a shift point for controlling the automatic transmission provided in the vehicle based on the traveling resistance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
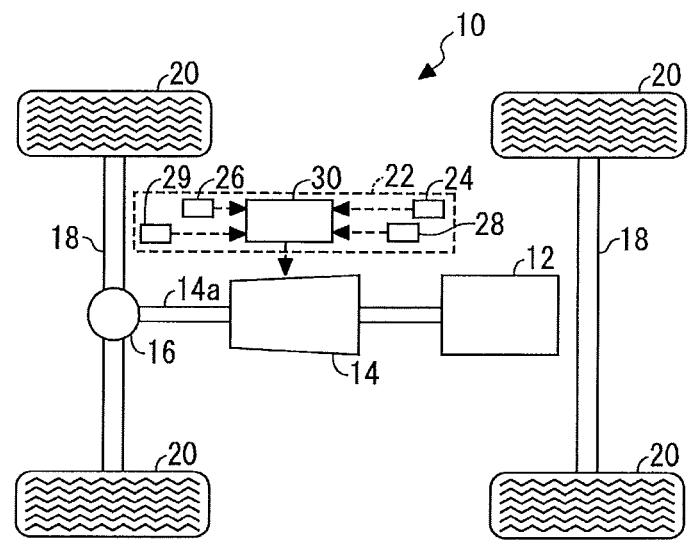
FIG. 1 is a schematic view of a vehicle mounted with a speed control system according to an embodiment.

A common reference numeral is assigned to the same components in the following illustrative embodiments, and repetitive descriptions will be omitted as deemed appropriate.

First Embodiment

FIG. 1 is a schematic view of a vehicle 10 mounted with a speed control system 22 according to an embodiment. As shown in FIG. 1, the vehicle 10 includes a driving source 12, an automatic transmission 14, a differential 16, an axle 18, a plurality of wheels 20, and the speed control system 22.

The driving source 12 is a device that generates a driving force causing the vehicle 10 having an internal combustion engine such as an engine to travel. The driving source 12 may include both an internal combustion engine and an electric motor. The driving source 12 outputs the generated driving force to the automatic transmission 14.

The automatic transmission 14 is also called an automatic transmission and switches gear positions according to an opening degree of a throttle or a rotation speed of an output shaft 14a. The automatic transmission 14 outputs a converted rotation driving force to the differential 16 through the output shaft 14a.

The differential 16 is provided, for example, on a rear axle 18. The differential 16 absorbs a difference in the rotation speed between the right and left wheels 20 and transmits the rotation driving force output by the automatic transmission 14 to the rear wheel 20 through the axle 18.

A pair of the axles 18 connect the right and left wheels 20 of the front or the rear respectively. The rear axle 18 transmits the rotation driving force transmitted from the differential 16 to the wheel 20.

A total of four wheels 20 are provided in the front, rear, right, and left of the vehicle 10. The rotation driving force output by the driving source 12 is transmitted to the rear wheels 20 through the axle 18, and the rotation driving force is transmitted to the road surface to cause the vehicle 10 to travel.

The speed control system 22 controls the automatic transmission 14. The speed control system 22 includes an acceleration sensor 24, a vehicle speed sensor 26, an opening degree sensor 28, a braking sensor 29, and a speed control device 30.

The acceleration sensor 24 measures the forward/backward acceleration of the vehicle 10 and outputs the acceleration sensor value indicating the acceleration to the speed control device 30. The acceleration sensor 24 may be an element that converts the acceleration acting on the vehicle 10 into an electrical signal by a piezoelectric element, micro electro mechanical systems (MEMS), or the like and outputs the electrical signal.

The vehicle speed sensor 26 detects the vehicle speed information for calculating the forward/backward speed of the vehicle 10 and outputs the vehicle information to the speed control device 30. The vehicle speed sensor 26 includes, for example, a Hall element provided in a vicinity of an output shaft 14a of the automatic transmission 14. In this case, the vehicle speed sensor 26 may output, for example, the output rotation of the output shaft 14a of the automatic transmission 14 as the vehicle speed information. The vehicle speed information indicating the output rotation may be any one of, for example, the rotation speed of the output shaft 14a of the automatic transmission 14, the rotation speed of the wheel 20, and the rotation speed of the output shaft of the driving source 12.

The opening degree sensor 28 detects opening degree information, which is an opening degree of a throttle valve for adjusting a supply amount of air-fuel mixture or air to the driving source 12 and outputs the information to the speed control device 30. The opening degree sensor 28 may be, for example, a position sensor provided in a vicinity of the throttle valve. The opening degree information may be on the opening degree of an accelerator.

The vehicle 10 includes the braking sensor 29 which detects the braking information for calculating a braking force by a brake and outputs the information to the speed control device 30. The braking sensor 29 may output, for example, the brake fluid pressure generated by a brake operation by a driver as braking information.

The speed control device 30 selects a shift mode based on the vehicle information and controls the gear position of the automatic transmission 14 at a shift point according to the shift mode.

Figure 2:
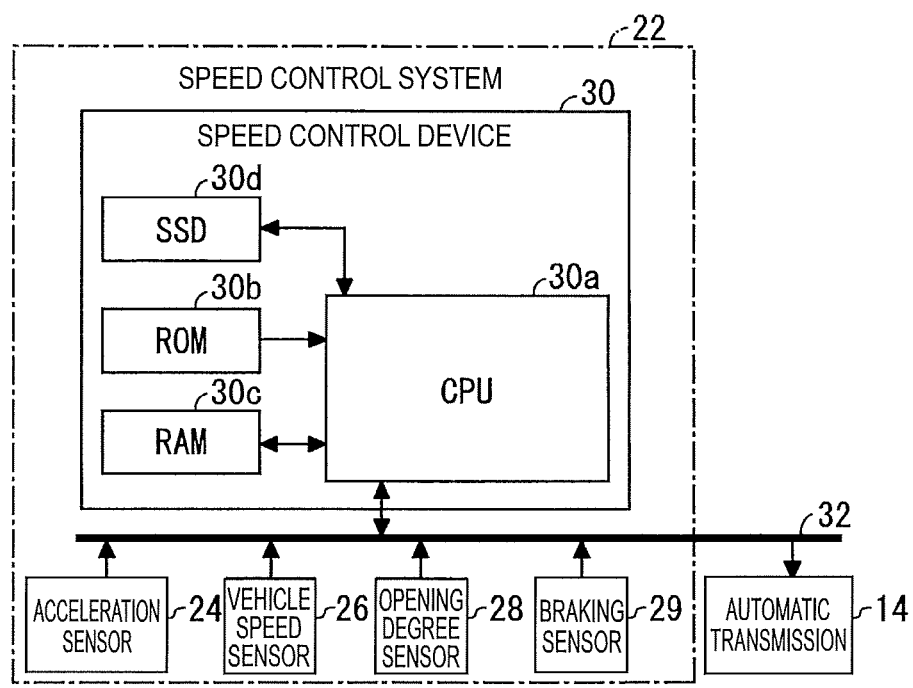
FIG. 2 is a block diagram showing an overall configuration of the speed control system including a speed control device according to the embodiment.

FIG. 2 is a block diagram showing an overall configuration of the speed control system 22 including the speed control device 30 according to the embodiment. As shown in FIG. 2, the speed control system 22 includes the acceleration sensor 24, the vehicle speed sensor 26, the opening degree sensor 28, the speed control device 30, and an in-vehicle network 32.

The speed control device 30 is a computer such as an electronic control unit (ECU). The speed control device 30 includes a central processing unit (CPU) 30a, a read only memory (ROM) 30b, a random access memory (RAM) 30c, and a solid state drive (SSD) 30d. The CPU 30a, the ROM 30b, and the RAM 30c may be integrated into the same package.

The CPU 30a is an example of a hardware processor, reads a program stored in a nonvolatile storage device such as the ROM 30b, SSD 30d, or the like, and executes various calculation processing and controls according to the program. The CPU 30a executes, for example, processing of speed control for controlling the automatic transmission 14.

The ROM 30b stores data such as respective programs and parameters needed in executing the programs. The RAM 30c temporarily stores various data to be used in the calculation by the CPU 30a. The SSD 30d is a rewritable nonvolatile storage device and maintains the data even when the power of the speed control device 30 is turned off.

The in-vehicle network 32 includes a controller area network (CAN) and a local interconnect Network (LIN). The in-vehicle network 32 connects with the acceleration sensor 24, the vehicle speed sensor 26, the opening degree sensor 28, the braking sensor 29, the speed control device 30, and the automatic transmission 14, configured to transmit and receive information to and from one another.

Figure 3:
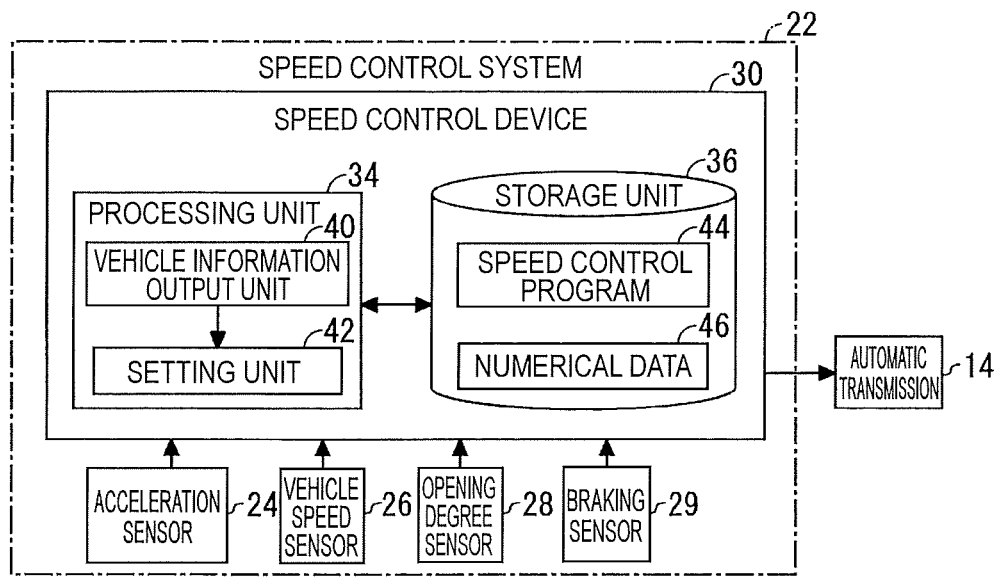
FIG. 3 is a functional block diagram for describing a function of the speed control device.

FIG. 3 is a functional block diagram for describing functions of the speed control device 30. As shown in FIG. 3, the speed control device 30 includes a processing unit 34 and a storage unit 36.

The processing unit 34 is realized as a function of the CPU 30a. The processing unit 34 functions as a vehicle information output unit 40 and a setting unit 42. The processing unit 34 reads a speed control program 44 stored in the storage unit 36 and functions as the vehicle information output unit 40 and the setting unit 42. Some or all of the vehicle information output unit 40 and the setting unit 42 may be configured with an application specific integrated circuit (ASIC), a field-programmable gate array (FPGA), or the like.

The vehicle information output unit 40 calculates or obtains the vehicle information and outputs the information to the setting unit 42.

For example, the vehicle information output unit 40 obtains a forward/backward acceleration sensor value GS of the vehicle 10 measured by the acceleration sensor 24 provided in the vehicle 10. Here, the acceleration acting by forward/backward gravity acceleration g of the vehicle 10 on a road surface inclined at an inclination angle θ is gradient acceleration GA (=g*sin θ). In this case, the acceleration sensor value GS can be expressed by the following expression (1) including the sum of an actual acceleration VA and the gradient acceleration GA to be described below.

$$GS = VA + GA \quad (1)$$

The vehicle information output unit 40 calculates an acceleration sensor correction value GS' as vehicle information from the acceleration sensor value GS based on the following expression (1a). The acceleration sensor correction value GS' is obtained when the acceleration sensor value GS is offset by the acceleration ($=g*\mu_r$) by the rolling resistance RR. Here, $\mu_r$ is a rotating coefficient. The acceleration sensor correction value GS' is an example of the vehicle measurement information.

$$GS'=GS+g*\mu_r \quad (1a)$$

The vehicle information output unit 40 calculates a forward/backward actual acceleration VA of the vehicle 10 as vehicle information based on the following expression (2). Specifically, the vehicle information output unit 40 repeatedly calculates vehicle speed CV based on the vehicle information at different times obtained from the vehicle speed sensor 26. The vehicle information output unit 40 calculates and obtains the forward/backward actual acceleration VA of the vehicle 10 by time differentiation of a plurality of vehicle speeds CV. In other words, the actual acceleration VA is the forward and back acceleration of the vehicle 10 obtained from the vehicle information which is an output rotation of the automatic transmission 14 and is closer to the real acceleration of the vehicle 10 than the acceleration sensor value GS.

$$VA=dCV/dt \quad (2)$$

where

CV: vehicle speed ($=RS*2\pi*WR/DfR$)

RS: rotation speed of output shaft 14a of automatic transmission 14

DfR: gear ratio of differential 16 (=differential gear ratio)

WR: radius of wheel 20

The vehicle information output unit 40 calculates a traveling driving force RF as vehicle information based on a driving force DF output from the driving source 12 and an air resistance AR acting on the vehicle 10. Specifically, as shown in the following expression (3), the vehicle information output unit 40 may calculate a value obtained by subtracting the air resistance AR from the driving force DF of the driving source 12 as a traveling driving force RF. The vehicle information output unit 40 may calculate the driving force DF of the driving source 12 from the driving force characteristics previously associated with the output rotation such as the opening degree of the throttle valve (or the opening degree of the accelerator), the rotation speed of the output shaft 14a and the like. The air resistance AR may be calculated by the expression (3a).

$$RF=DF-AR \quad (3)$$

$$AR=\lambda*S*CV^2 \quad (3a)$$

where $\lambda$: a coefficient of the air resistance

S: font projection area of the vehicle 10

The setting unit 42 sets a shift point for controlling the automatic transmission 14 and controls the automatic transmission 14 based on the vehicle information obtained from the vehicle information output unit 40. Specifically, the setting unit 42 sets the shift points based on a comparison between the vehicle information and the selection threshold. For example, the setting unit 42 selects a shift mode for setting the shift point by comparing the selection threshold according to the gradient of the road surface during the traveling of the vehicle 10 with the vehicle information. The setting unit 42 controls the automatic transmission 14 based on the shift point indicated by the gear shift map associated with the shift mode.

The storage unit 36 is realized as the functions of the ROM 30b, the RAM 30c, and the SSD 30d. The storage unit 36 is connected to the processing unit 34 such that information can be input from and output to the processing unit 34. The storage unit 36 may be an external storage device connected through a network or the like. The storage unit 36 stores a program executed by the processing unit 34, information needed in the execution of the program, information generated by the execution of the program, and the like. For example, the storage unit 36 stores the speed control program 44 to be executed by the processing unit 34. The speed control program 44 may be stored in and provided from a computer-readable storage medium such as a compact disc read only memory (CD-ROM), a digital versatile disc read only memory (DVD-ROM), or the like, or may be provided through a network such as internet or the like. The storage unit 36 stores numerical data 46 including a gear shift map, a selection threshold value, and the like needed when the processing unit 34 executes the speed control program 44. The storage unit 36 temporarily stores the values of respective sensors 24, 26, 28, and 29 and the calculated values obtained when the processing unit 34 executes the speed control program 44.

Figure 4:
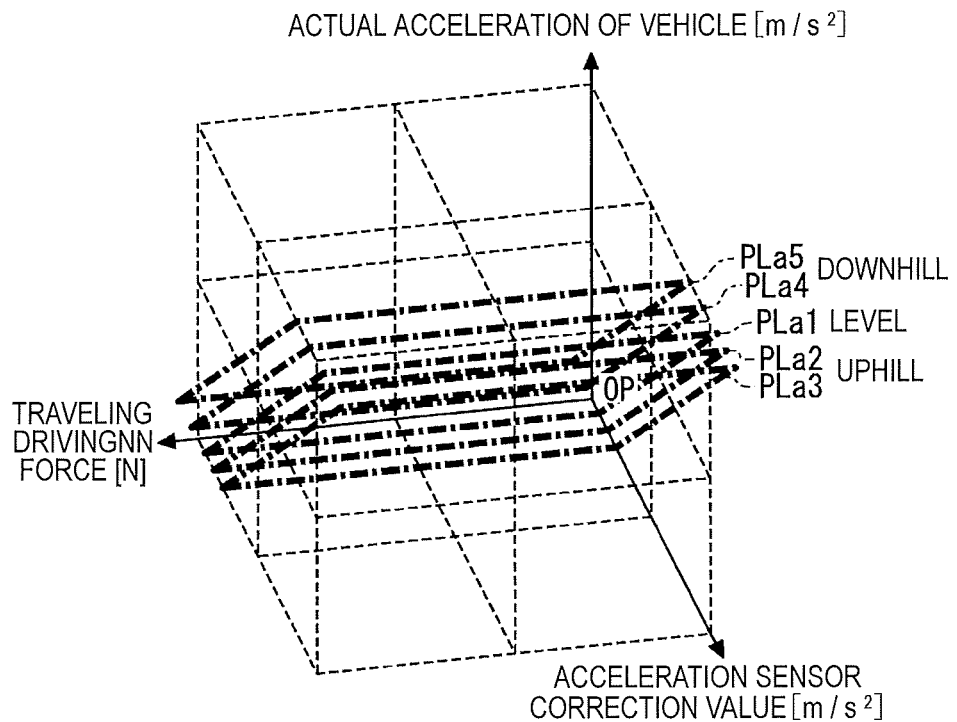
FIG. 4 is a view for describing a selection threshold according to a first embodiment.

Next, a setting method of a selection threshold and a shift mode according to the first embodiment will be described. FIG. 4 is a view for describing a selection threshold according to the first embodiment. The three axes in FIG. 4 represent the actual acceleration VA, the acceleration sensor correction value GS', and the traveling driving force RF of the vehicle 10. In the following, the space shown in FIG. 4 will be described as a vehicle information space. The acceleration sensor correction value GS' is a value obtained when the acceleration sensor value GS is offset by the acceleration ($=-g*\mu_r$) by rolling resistance RR on the axis of the traveling driving force RF.

The gradient acceleration GA indicated by the inclination angle θ of the road surface can be expressed by the following expression (4) based on the expression (1) including the acceleration sensor value GS obtained from the acceleration sensor 24 and the calculated actual acceleration VA.

$$GA=GS-VA \quad (4)$$

Here, when the gradient acceleration GA is constant, the gradient acceleration GA, which is a difference between the acceleration sensor value GS and the actual acceleration VA, is represented by the flat planes PLa1, PLa2, PLa3, PLa4, and PLa5 in the vehicle information space, as denoted by the thick dotted lines in FIG. 4. The flat planes PLa1, PLa2, PLa3, PLa4, and PLa5 are described as discrete for the sake of description, but the flat planes are continuously formed according to the gradient acceleration GA. In the following description, the flat planes PLa1, PLa2, PLa3, PLa4, and PLa5 will be referred to as a flat plane PLa, when it is not necessary to distinguish them. Each flat plane PLa is parallel to the axis of the traveling driving force RF and intersects with the axis of the actual acceleration VA and the axis of the acceleration sensor correction value GS' at 45°. The flat plane PLa1 represents a case where a road surface is flat, that is, when the inclination angle θ=0. The flat plane PLa1 intersects with the axis of the acceleration sensor correction value GS' at $GS'=g*\mu_r$. The flat planes PLa2 and PLa3 represent a case where a road surface is uphill, that is, where the inclination angle θ is positive. The flat planes PLa4 and PLa5 represent a case where a road surface is downhill, that is, when the inclination angle θ is negative.

The setting unit 42 may select a shift mode on any side of the selection threshold indicated by the flat plane PLa, of which the position (hereinafter referred to as vehicle information position), in the vehicle information space, indicated by the vehicle information including the traveling driving force RF, the actual acceleration VA, and the acceleration sensor value GS is different for each inclination angle θ of a road surface or gradient acceleration GA. The selection threshold may be set in advance or the configuration may be such that a user of the vehicle 10 such as a driver can change the selection threshold.

For example, when a shift mode is selected depending on whether the road surface is uphill or downhill, the setting unit 42 may select the shift mode on either side of the selection threshold indicated by the flat plane PLa1. Specifically, the setting unit 42 selects a first shift mode as long as the vehicle information position is on the upper left of the selection threshold in the vehicle information space in FIG. 4. The first shift mode is, for example, a mode in which fuel efficiency is valued. The setting unit 42 selects a second shift mode as long as the vehicle information position is on the lower right of the selection threshold in the vehicle information space in FIG. 4. For example, the second shift mode is a highly operational mode in which drivability and responsiveness are valued. When a shift mode is selected depending on whether or not an uphill inclination of a road surface is equal to or greater than a predetermined inclination angle θ, the setting unit 42 may select a shift mode on either side of the selection thresholds indicated by the flat planes PLa2 and PLa3. When a shift mode is selected depending on whether or not a downhill inclination of a road surface is equal to or greater than a predetermined inclination angle θ, the setting unit 42 may select a shift mode on either side of the selection thresholds indicated by the flat planes PLa4 and PLa5.

Since each flat plane PLa serving as a selection threshold is parallel to the axis of the traveling driving force RF, the setting unit 42 may determine which side of the selection threshold the vehicle information position is on based on the actual acceleration VA and the acceleration sensor correction value GS' out of the vehicle information. In other words, the setting unit 42 may select a shift mode, using a straight line, obtained when each flat plane PLa is projected onto a two-dimensional flat plane of the actual acceleration VA and the acceleration sensor value GS, as the selection threshold.

Figure 5:
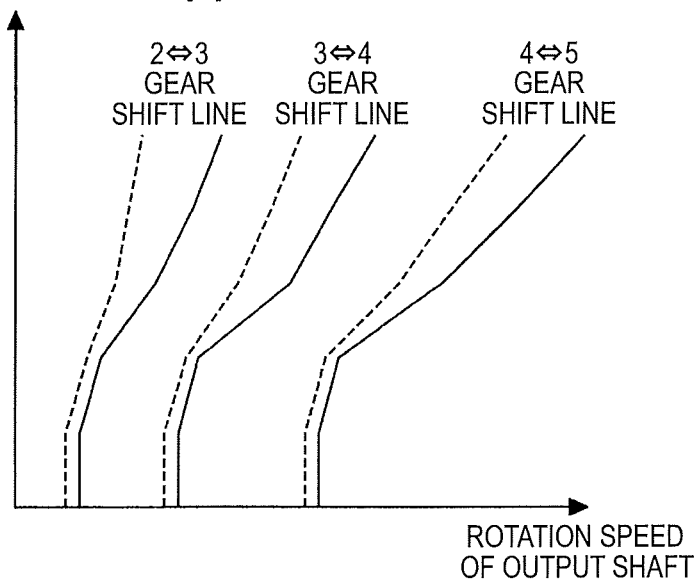
FIG. 5 is an example of a graph of a gear shift map.

Next, a determination method of a shift point by the setting unit 42 will be described. FIG. 5 is an example of a graph of a gear shift map. The setting unit 42 determines a shift point at which the gear positions of the automatic transmission 14 are switched based on the gear shift map associated with respective shift modes. As shown in FIG. 5, the gear shift map shows an upshift line (refer to a solid line) and a downshift line (refer to a dotted line) associated with the rotation speed RS of the output shaft 14a of the automatic transmission 14 and the throttle opening degree indicated by the opening degree information, and the shift point. When the rotation speed RS and the throttle opening degree cross the upshift line or the downshift line, the setting unit 42 determines that a shift point is reached and switches the gear positions of the automatic transmission 14 up or down. The gear shift map is set for each shift mode and stored as a part of the numerical data 46 of the storage unit 36. Therefore, the setting unit 42 obtains a gear shift map from the numerical data 46 according to the set shift mode and determines a shift point.

Figure 6:
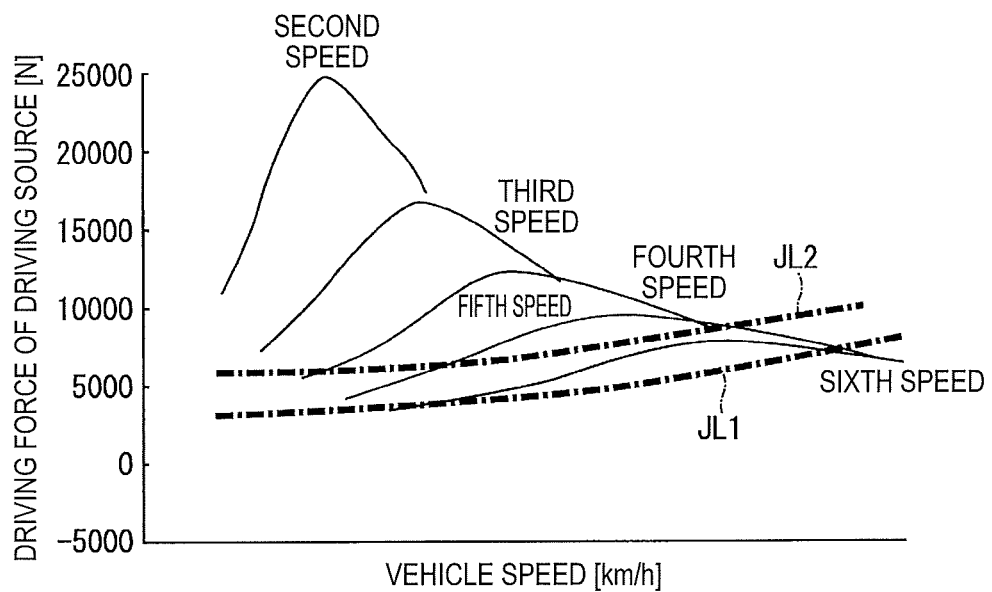
FIG. 6 is an example of a graph showing a relationship between vehicle speed and driving force of driving source for describing generation of the gear shift map.

FIG. 6 is an example of a graph showing a relationship between the vehicle speed CV and the driving force DF of the driving source 12 for describing the generation of the gear shift map. The horizontal axis in FIG. 6 indicates the vehicle speed CV of the vehicle 10 and the vertical axis indicates the driving force DF output by the driving source 12. The solid line (hereinafter, the maximum driving force line) in FIG. 6 indicates the driving force DF of the driving source 12 in each gear position from a second speed to a sixth speed with the throttle opening degree being maximized. The thick chain line in FIG. 6 indicates point determination lines JL1 and JL2 based on the traveling resistance DR in the first shift mode and the second shift mode. The point determination lines JL1 and JL2 are the lines for determining the shift points at each vehicle speed, and may be lines along which the traveling resistance DR is shifted upward. The traveling resistance DR is calculated, for example, from the sum of the air resistance AR, the gradient resistance GR, and the rolling resistance RR.

A necessary condition for maintaining the vehicle speed CV is that the driving force DF of the driving source 12 is greater than the traveling resistance DR acting on the vehicle 10. Therefore, the gear shift map is generated by the gear position at which the driving force DF, greater than the traveling resistance DR, of the driving source 12 is output in each shift mode. Further, the point determination lines JL1 and JL2 of the gear shift map is set based on the condition valued in each shift mode, for example, the fuel efficiency in the first shift mode and the drivability in the second shift mode.

Figure 7:
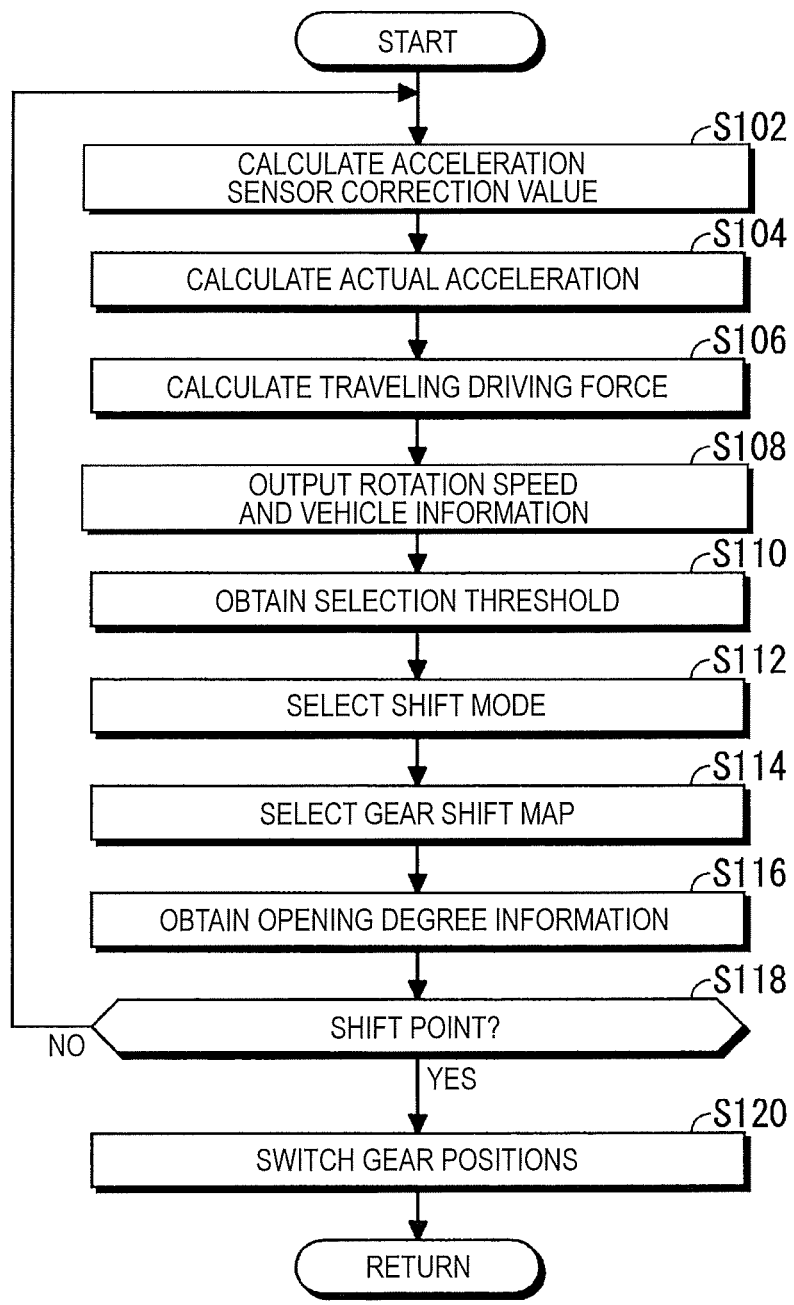
FIG. 7 is a flowchart of a speed control processing according to the first embodiment executed by a processing unit.

FIG. 7 is a flowchart of the speed control processing according to the first embodiment executed by the processing unit 34. The processing unit 34 executes the speed control processing by reading the speed control program 44.

In the speed control processing shown in FIG. 7, the vehicle information output unit 40 obtains the acceleration sensor value GS from the acceleration sensor 24 and calculates the acceleration sensor correction value GS' shown in the expression (1a) (S102). The vehicle information output unit 40 calculates the actual acceleration VA based on the expression (2) which includes the vehicle speed CV calculated from the rotation speed RS, obtained from the vehicle speed sensor 26, of the output shaft 14a of the automatic transmission 14 (S104). The vehicle information output unit 40 calculates the traveling driving force RF based on the expression (3) which includes the driving force DF of the driving source 12 and the air resistance AR (S106). The vehicle information output unit 40 outputs to the setting unit 42 the rotation speed RS of the output shaft 14a of the automatic transmission 14, and the vehicle information including the acceleration sensor correction value GS', the actual acceleration VA, and the traveling driving force RF (S108).

The setting unit 42 obtains the selection threshold according to the gradient of a road surface from the numerical data 46 of the storage unit 36 (S110). The setting unit 42 selects a shift mode based on the comparison between the vehicle information and the selection threshold (S112). Specifically, the setting unit 42 selects either the first shift mode or the second shift mode on either side of the selection threshold indicated by the flat plane PLa. The setting unit 42 obtains a gear shift map from the numerical data 46 of the storage unit 36 according to the selected shift mode (S114). The setting unit 42 obtains the opening degree information indicating the opening degree of the throttle from the opening degree sensor 28 (S116). The setting unit 42 determines whether or not a shift point is reached based on the rotation speed RS and the opening degree information from the vehicle information output unit 40 (S118).

The setting unit 42 repeats the step S102 onward, when it is determined from the rotation speed RS and the opening degree information that a shift point is not reached (S118: No). On the other hand, the setting unit 42 switches the gear positions of the automatic transmission 14 (S120) and executes the step S102 onward, when it is determined from the vehicle speed CV and the opening degree information that a shift point is reached (S118: Yes).

As described above, the speed control device 30 selects a shift mode by comparing the vehicle information with the selection threshold that varies by the situation of the vehicle 10 and controls the automatic transmission 14 by a shift point based on the gear shift map associated with the shift mode. In this way, the speed control device 30 automatically selects a shift mode according to the situation of the vehicle 10 without relying on an occupant such as a driver or the like and can control the automatic transmission 14 at an appropriate shift point according to the shift mode.

The speed control device 30 selects a shift mode based on the selection threshold according to the gradient of a road surface. In this way, the speed control device 30 can select a shift mode appropriate for the gradient of the road surface including an uphill, levelness and a downhill based on the comparison between the selection threshold and the vehicle information. As a result, the speed control device 30 can control the automatic transmission 14 at an appropriate shift point according to the gradient of the road surface during the traveling of the vehicle 10. In particular, the speed control device 30 can select the shift mode appropriately even if the weight (hereinafter, vehicle weight CM) of the vehicle 10 is high like a pick-up truck or the vehicle 10 is susceptible to the influence of gradient of the road surface. Further, an occupant such as a driver tends to switch the shift modes according to the gradient of the road surface, and the speed control device 30 can select the shift mode in line with the tendency, that is, in line with the occupant's sense.

Second Embodiment

Figure 8:
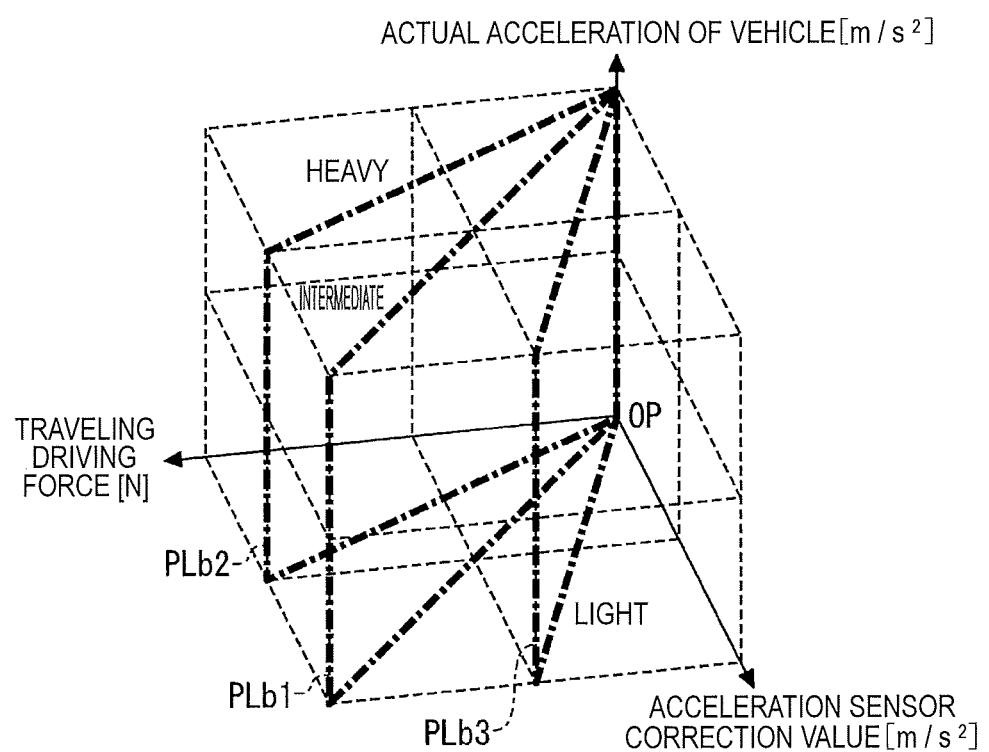
FIG. 8 is a view for describing a selection threshold according to a second embodiment.

Next, a speed control device 30 according to a second embodiment that selects a shift mode in accordance with a selection threshold based on a vehicle weight CM will be described. FIG. 8 is a view for describing the selection threshold according to the second embodiment.

In the speed control device 30 according to the second embodiment, the setting unit 42 sets a selection threshold according to the vehicle weight CM and selects a shift mode by comparing the selection threshold with the vehicle information. Here, when the gradient resistance GR (=CM*g*sin θ) in accordance with the gradient of a road surface during the traveling of the vehicle 10, the rolling resistance RR (=CM*g*$\mu_r$), and the air resistance AR are taken into consideration, the motion equation of the vehicle 10 is expressed by the following expression (5).

$$DF-(GR+RR+AR)=CM*VA \quad (5)$$

The vehicle weight CM can be expressed by the following expression (6) from the expression (5) with the traveling driving force RF, the acceleration sensor value GS(=VA+GR/CM), and the acceleration sensor correction value GS' (=GS+g*$\mu_r$).

$$CM=RF/(GS+g*\mu_r)=RF/GS' \quad (6)$$

When the vehicle weight CM is constant, the vehicle weight CM expressed by the expression (6) is represented in the vehicle information space by flat planes PLb1, PLb2, and PLb3 denoted by the thick chain lines in FIG. 8. The flat planes PLb1, PLb2, and PLb3 are described as discrete for the sake of description but are planes continuously formed according to the vehicle weight CM. In the following description, when it is not necessary to distinguish the flat planes PLb1, PLb2, and PLb3, the planes will be referred to as a flat plane PLb. The flat plane PLb1 indicates the case where the vehicle weight CM assumes an intermediate value. The flat plane PLb2 indicates the case where the vehicle weight CM is heavier than the intermediate value. The intermediate value may be, for example, half the maximum load. The flat plane PLb3 indicates the case where the vehicle weight CM is lighter than the intermediate value. Each flat plane PLb is parallel to the actual acceleration VA and is a plane rotated around the axis of the actual acceleration VA.

The setting unit 42 selects a shift mode, using different flat planes PLb as thresholds according to the vehicle weight CM. The setting unit 42 may select a shift mode on any side of the selection threshold indicated by a flat plane PLb, of which the position in the vehicle information space (hereinafter, vehicle information position) indicated by the vehicle information including the traveling driving force RF, the actual acceleration VA, and the acceleration sensor value GS varies for each vehicle weight CM in a circumferential direction around the axis of the actual acceleration VA. The selection threshold may be set in advance, or the configuration may be such that a user of the vehicle 10 such as a driver can change the selection threshold.

For example, when a shift mode is selected based on whether or not the vehicle weight CM is heavier than the intermediate value, the setting unit 42 may select the shift mode on either side of the selection threshold indicated by the middle flat plane PLb1. Specifically, the setting unit 42 selects the first shift mode in which the fuel efficiency is valued, as long as the vehicle information position is on the counterclockwise side of the selection threshold, indicated by the flat plane PLb1, around the axis of the actual acceleration VA in the vehicle information space in FIG. 8. The setting unit 42 selects the second shift mode in which the drivability is valued, as long as the vehicle information position is on the clockwise side of the selection threshold, indicated by the flat plane PLb1, around the axis of the actual acceleration VA. When a shift mode is selected based on whether or not the vehicle weight CM is significantly heavy, the setting unit 42 may select a shift mode on either side of the selection threshold indicated by the flat plane PLb2 in a case where the vehicle weight CM is heavy. When a shift mode is selected based on whether or not the vehicle weight CM is significantly light, the setting unit 42 may select a shift mode on either side of the selection threshold indicated by the flat plane PLb3 in a case where the vehicle weight CM is light.

Since the flat plane PLb serving as a selection threshold is parallel to the axis of the actual acceleration VA, the setting unit 42 may select a shift mode depending on which side of the selection threshold the vehicle information position is on, based on the traveling driving force RF and the acceleration sensor correction value GS' out of the vehicle information. In other words, the setting unit 42 may select a shift mode, using a straight line, obtained when each flat plane PLb is projected onto a two-dimensional flat plane of the traveling driving force RF and the acceleration sensor correction value GS', as the selection threshold.

Figure 9:
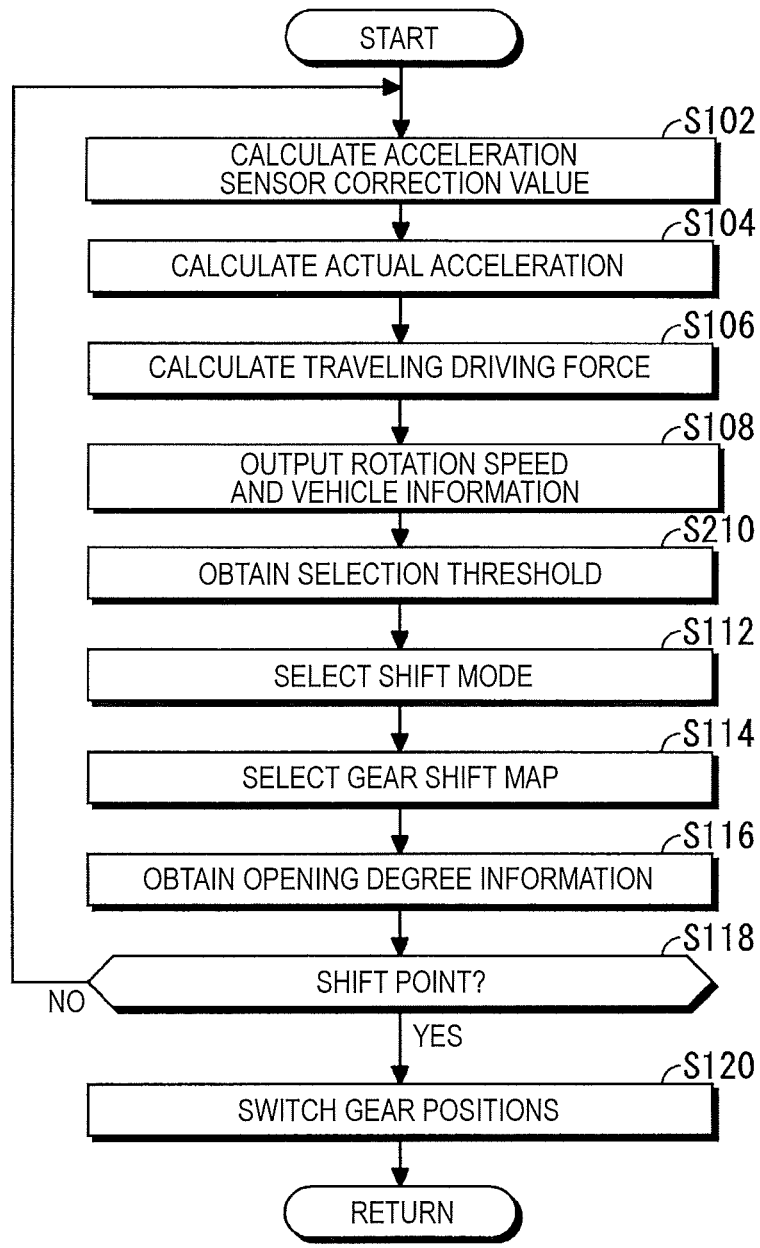
FIG. 9 is a flowchart of a speed control processing according to the second embodiment executed by the processing unit.

FIG. 9 is a flowchart of the speed control processing according to the second embodiment executed by the processing unit 34. The processing unit 34 executes the speed control processing by reading the speed control program 44. The same step numerals will be assigned to the steps same as those of the above embodiment and the descriptions will be omitted or simplified.

As shown in FIG. 9, in the speed control processing according to the second embodiment, the vehicle information output unit 40 outputs the rotation speed RS of the output shaft 14a of the automatic transmission 14 and the vehicle information to the setting unit 42 (S102 to S108).

The setting unit 42 obtains the selection threshold according to the vehicle weight CM from the numerical data 46 of the storage unit 36 (S210). The setting unit 42 determines whether or not a shift point is reached by the shift mode selected based on the selection threshold and the vehicle information and controls the automatic transmission 14 (S112 to S120).

The speed control device 30 as described above selects a shift mode based on the selection threshold according to the vehicle weight CM. In this way, based on the comparison between the selection threshold and the vehicle information, the speed control device 30 can select a shift mode appropriate for the vehicle weight CM that varies depending on the loading of cargo or towing of a towed vehicle. As a result, the speed control device 30 can control the automatic transmission 14 at an appropriate shift point according to the vehicle weight CM. In particular, the speed control device 30 can select a shift mode appropriately even for the vehicle 10, like a pick-up truck, of which the vehicle weight CM varies greatly by a towed vehicle or the like. Further, an occupant such as a driver tends to switch the shift mode according to the vehicle weight CM, but the speed control device 30 can select the shift mode in line with the tendency, that is, in line with the occupant's sense.

Third Embodiment

Figure 10:
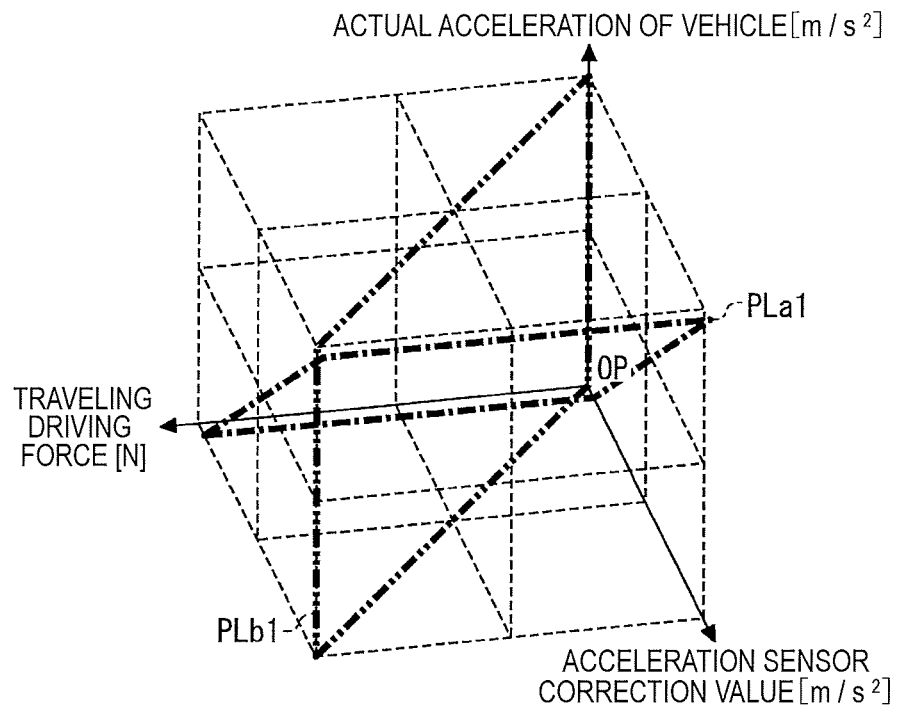
FIG. 10 is a view for describing a selection threshold according to a third embodiment.

Next, the speed control device 30 according to a third embodiment that selects a shift mode in accordance with the selection threshold based on the gradient of a road surface and the vehicle weight CM will be described. FIG. 10 is a view for describing the selection threshold according to the third embodiment.

In the speed control device 30 according to the third embodiment, the setting unit 42 selects a shift mode by comparing the selection threshold according to the gradient of the road surface and the vehicle weight CM with the vehicle information. For example, the setting unit 42 sets as the selection thresholds the flat plane PLa1 (refer to one-dot chain line) when the gradient acceleration GA is constant and the flat plane PLb1 (refer to two-dot chain line) when the vehicle weight CM is constant. That is, the selection threshold according to the third embodiment is composed of the two flat planes PLa1 and PLb1. The flat planes PLa1 and PLb1 shown in the figure are typical flat planes, and any of a plurality of flat planes continuously formed in accordance with the inclination angle θ of the gradient of the road surface and the vehicle weight CM may be used as the flat planes PLa1 and PLb1 of the selection threshold. The setting method of both the flat planes Pla1 and PLb1 is the same as in the first embodiment and the second embodiment.

The setting unit 42 selects the shift mode in accordance with which one of the four areas divided by the two flat planes PLa1 and PLb1 the vehicle information position belongs to. For example, the setting unit 42 selects the first shift mode, as long as the vehicle information position is in the area on the upper left of the flat plane PLa1 according to the gradient of the road surface and on the counterclockwise side of the flat plane PLb1 according to the vehicle weight CM. The setting unit 42 selects the second shift mode, as long as the vehicle information position is in the area on the lower right of the flat Plane PLa1 according to the gradient of the road surface and on the clockwise side of the flat plane PLb1 according to the vehicle weight CM. When the vehicle information position is in the area other than the two areas described above, the setting unit 42 may select a shift mode (hereinafter, a third shift mode) other than the first shift mode and the second shift mode. The third shift mode is an intermediate shift mode between the first shift mode and the second shift mode and may be a shift mode in which the fuel efficiency and the drivability are equally valued.

Since the speed control processing according to the third embodiment is almost the same as the processing of the first embodiment and the second embodiment combined, the description will not be repeated.

Since the speed control device 30 according to the third embodiment as described above sets the shift mode in accordance with the selection threshold according to the gradient of the road surface and the vehicle weight CM, the shift mode can be set appropriately for both the gradient of the road surface and the vehicle weight CM.

Fourth Embodiment

Figure 11:
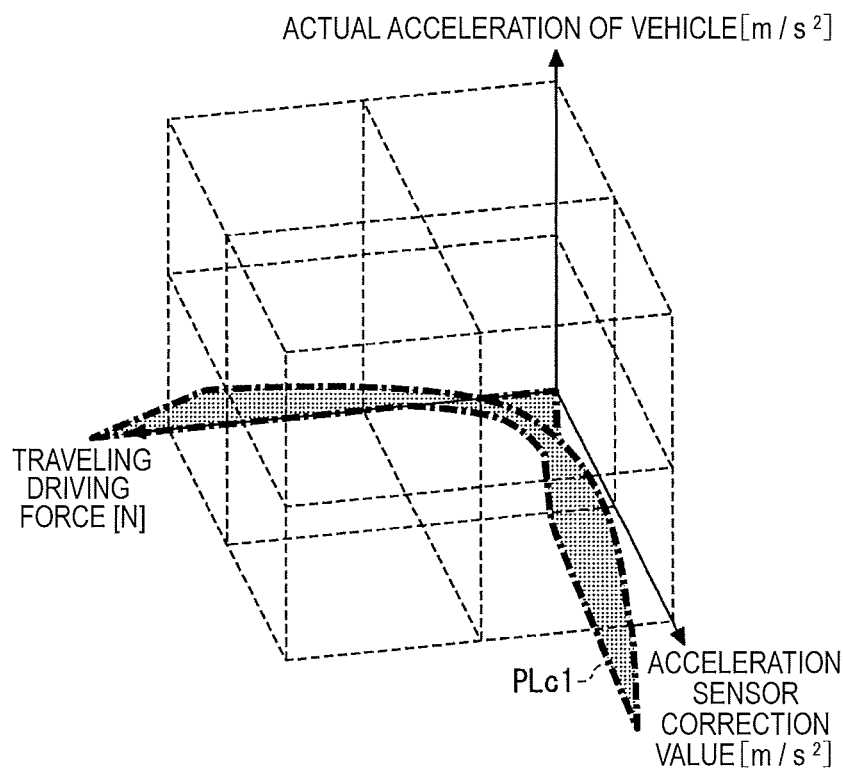
FIG. 11 is a view for describing a selection threshold according to a fourth embodiment.
Figure 12:
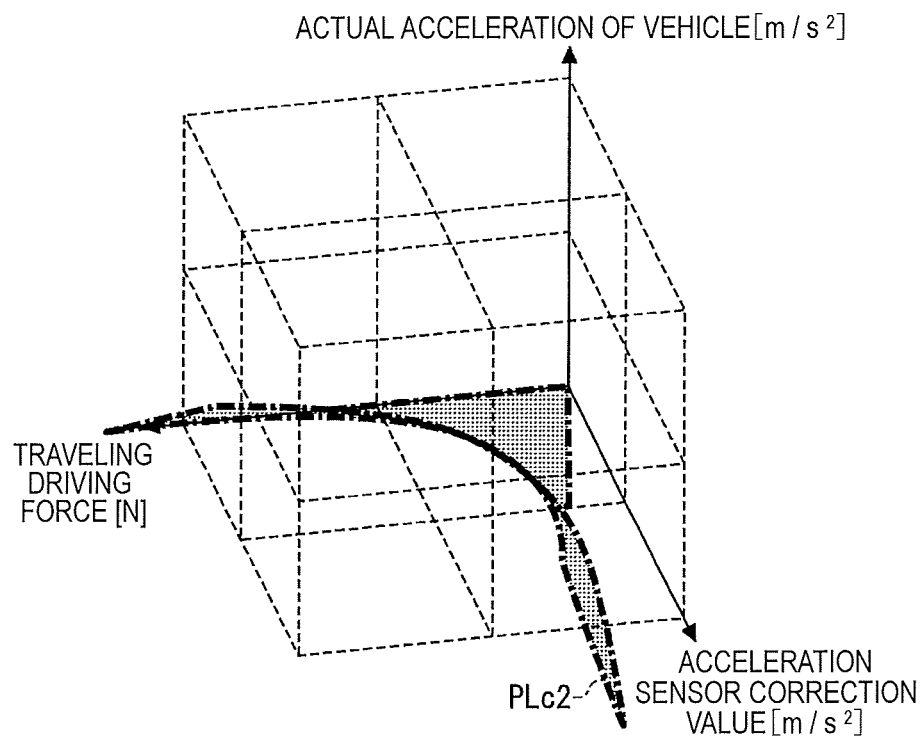
FIG. 12 is a view for describing another selection threshold according to the fourth embodiment.

Next, a fourth embodiment in which the shift mode is selected in accordance with the selection threshold based on the traveling driving force RF, the actual acceleration VA, and the acceleration sensor correction value GS' will be described. FIG. 11 is a view for describing the selection threshold according to the fourth embodiment. FIG. 12 is a view for describing another selection threshold according to the fourth embodiment.

In the speed control device 30 according to the fourth embodiment, the setting unit 42 selects the shift mode by comparing the selection threshold according to the traveling resistance DR determined from the vehicle weight CM and the road surface gradient during the traveling of the vehicle 10 with the vehicle information. For example, the traveling resistance DR is calculated from the sum of the air resistance AR, the gradient resistance GR, and the rolling resistance RR. Further, the setting unit 42 selects the shift mode by comparing the selection threshold according to the sum of the gradient resistance GR and the rolling resistance RR with the vehicle information. Here, the above expression (5), which is the motion equation of the vehicle 10, is modified into the following expression (7).

$$GR+RR=(DF-AR)*(1-VA/GS')=RF*(1-VA/GS') \quad (7)$$

Here, the traveling driving force RF (=DF−AR), the actual acceleration VA, and the acceleration sensor correction value GS' on the right side in the expression (7) are three axes in the vehicle information space. Therefore, when the sum of the gradient resistance GR and the rolling resistance RR is set constant as shown in the expressions (8) and (9), the sum of the gradient resistance GR and the rolling resistance RR is represented by curved planes PLc1 and PLc2 shown in FIGS. 11 and 12 in the vehicle information space. The gradient resistance GR and the rolling resistance RR increase or decrease as the vehicle weight CM and the inclination angle θ of the gradient increase or decrease.

$$RF*(1-VA/GS')=C1 \quad (8)$$

$$RF*(1-VA/GS')=C2 \quad (9)$$

where C1<C2.

The setting unit 42 may select a shift mode, using the curved planes PLc1 and PLc2 as the selection threshold. Specifically, the setting unit 42 may select the first shift mode in which the fuel efficiency is valued, as long as the vehicle information position is on the upper right of the selection threshold denoted by the curved plane PLc1 shown in FIG. 11. The setting unit 42 may select the third shift mode in which the drivability is valued, as long as the vehicle information position is on the lower left of the selection threshold denoted by the PLc2 shown in FIG. 12. When the vehicle information position is between the curved planes PLc1 in FIG. 11 and PLc2 in FIG. 12, the setting unit 42 may select the intermediate second shift mode between the first shift mode and the third shift mode.

As described above, the speed control device 30 according to the fourth embodiment selects a shift mode in accordance with the selection threshold, which is the selection threshold according to the traveling resistance DR, according to the sum of the gradient resistance GR and the rolling resistance RR which increases and decreases in accordance with the vehicle weight CM and the inclination angle θ of the gradient. In this way, the speed control device 30 can select a shift mode appropriate for the sum of the traveling resistance DR, the gradient resistance GR, and the rolling resistance RR, that is, for the vehicle weight CM and the inclination angle θ of the gradient, based on the selection threshold. As a result, the speed control device 30 can control the automatic transmission 14 at an appropriate shift point according to the sum of the gradient resistance GR and the rolling resistance RR during the traveling of the vehicle 10.

Fifth Embodiment

Figure 13:
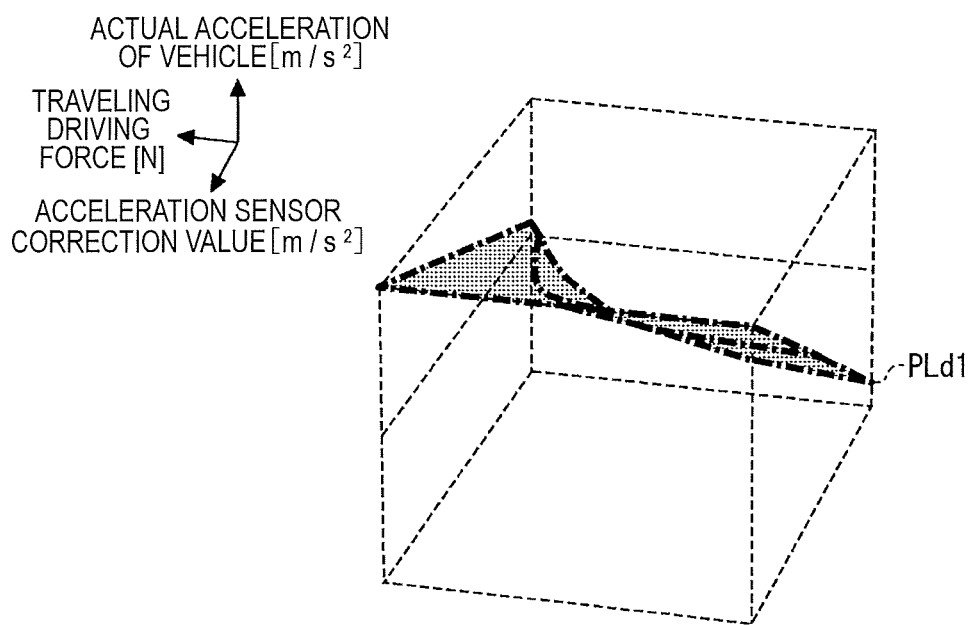
FIG. 13 is a view for describing a selection threshold according to a fifth embodiment.
Figure 14:
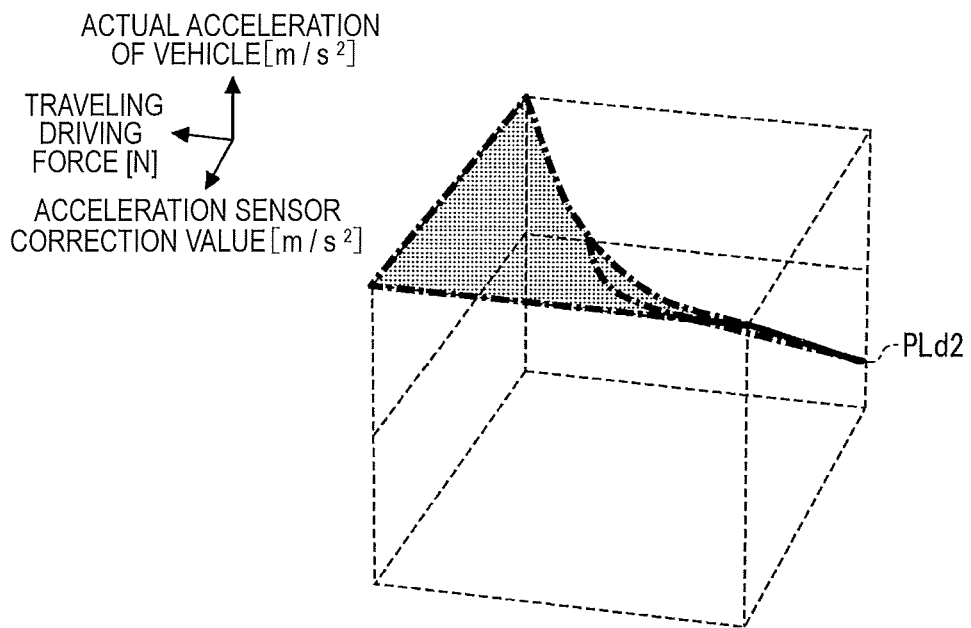
FIG. 14 is a view for describing the selection threshold according to the fifth embodiment.
Figure 15:
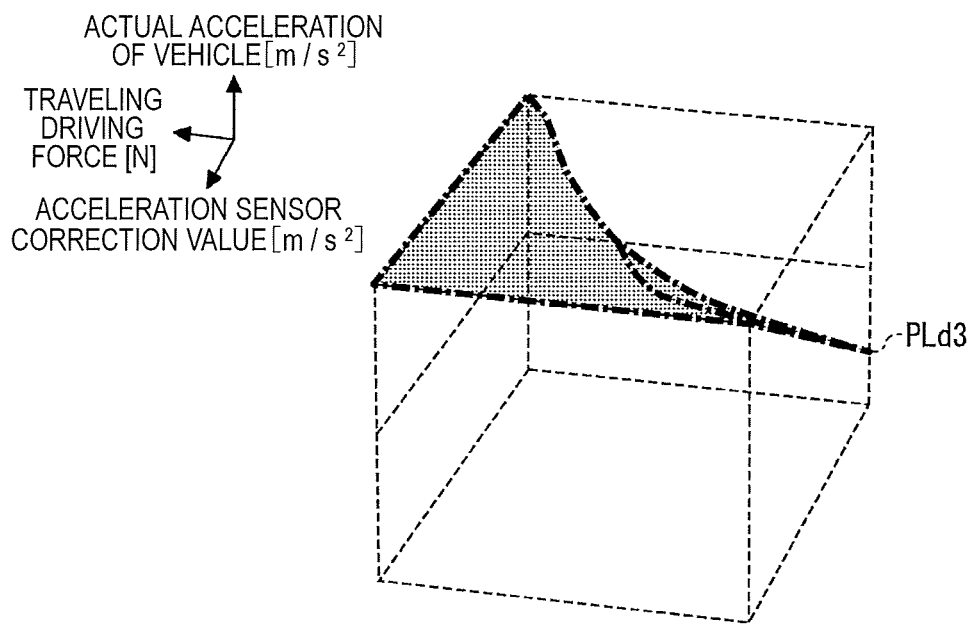
FIG. 15 is a view for describing a selection threshold according to the fifth embodiment.

Next, a fifth embodiment in which the selection threshold is set in a braking state will be described. FIGS. 13, 14, and 15 are views for describing the selection threshold according to the fifth embodiment. The coordinates of the vehicle information space in FIGS. 13, 14, and 15 are on the negative side, and the origin is outside (almost on the left side) the vehicle information space.

The setting unit 42 according to the fifth embodiment may select a shift mode in a braking state where a braking force BF by a brake is acting based on the comparison between the same selection threshold and the vehicle information as in the above embodiments. Here, the motion equation of the vehicle 10 with the braking force BF by the brake taken into consideration is expressed by the following expression (10). The setting unit 42 may calculate the brake force BF based on the braking information obtained from the braking sensor 29.

$$DF-(GR+RR+AR+BF)=CM*VA \tag{10}$$

The expression (10) is modified into the following expression (11).

$$GR+RR=(DF-AR-BF)*(1-VA/GS') \tag{11}$$

In the present embodiment, the traveling driving force RF includes the braking force BF as shown in expression (12).

$$RF=DF-AR-BF \tag{12}$$

The traveling driving force RF (=DF−AR−BF), the actual acceleration VA, and the acceleration sensor correction value GS' on the right side in the expression (11) are the three axes in the vehicle information space. Therefore, when the sum of the gradient resistance GR and the rolling resistance RR is set constant as shown in the following expressions (13), (14), and (15), the sum of the gradient resistance GR and the rolling resistance RR is represented in the vehicle information space by curved planes PLd1, PLd2, and PLd3 shown in FIGS. 13, 14, and 15. The gradient resistance GR and the rolling resistance RR increase or decrease as the vehicle weight CM and the inclination angle θ of the gradient increase or decrease.

$$RF*(1-VA/GS')=C3 \tag{13}$$

$$RF*(1-VA/GS')=C4 \tag{14}$$

$$RF*(1-VA/GS')=C5 \tag{15}$$

where C3>C4>C5.

The setting unit 42 may select a shift mode, using the curved planes PLd1, PLd2, and PLd3 as the selection threshold. Specifically, the setting unit 42 may select the first shift mode in which the fuel efficiency is valued, as long as the vehicle information position is on the lower left of the selection threshold denoted by the curved plane PLd1 shown in FIG. 13. The setting unit 42 may select the second shift mode between the first shift mode and the third shift mode, as long as the vehicle information position is between the selection threshold denoted by the curved plane PLd1 in FIG. 13 and the selection threshold denoted by the curved plane PLd2 in FIG. 14. The setting unit 42 may select the third shift mode in which the drivability is valued, as long as the vehicle information position is between the selection threshold denoted by the curved plane PLd2 in FIG. 14 and the selection threshold denoted by the curved plane PLd3 in FIG. 15. The setting unit 42 may select a fourth shift mode in which the braking by the driving source 12 such as engine braking and the drivability are valued, as long as the vehicle information position is on the lower left of the selection threshold denoted by the curved plane PLd3 in FIG. 15.

As described above, in the speed control device 30 according to the fifth embodiment, the setting unit 42 sets the selection threshold based on the traveling driving force RF which includes the braking force BF. In this way, the speed control device 30 can automatically select an appropriate shift mode when the driver is operating the brake. Further, by subdividing the selection threshold (for example, into three levels), the speed control device 30 can appropriately select the fourth shift mode in which the braking by the driving source 12 is valued in addition to the fuel efficiency and the drivability.

Sixth Embodiment

Next, a sixth embodiment in which a shift point is set by a calculation of the traveling resistance DR will be described.

The traveling resistance DR is calculated with the vehicle weight CM as a known value (DR=DF−CM*VA) in the related art, but setting unit 42 can calculate a shift point based on the traveling resistance DR in the speed control device 30 according to the sixth embodiment even if the vehicle weight CM is not a known value. Here, the traveling resistance DR can be expressed by the following expression (16) which includes the air resistance AR, the gradient resistance GR, and the rolling resistance RR.

$$DR=AR+GR+RR \tag{16}$$

Substitution of the right-hand side in the expression (7) into the expression (16) yields the expression (17).

$$DR=RF*(1-VA/GS')+AR \tag{17}$$

The right-hand side in the expression (17) does not include the vehicle weight CM. Therefore, the setting unit 42 can calculate the traveling resistance DR based on the expression (17) even if the vehicle weight CM is unknown. Specifically, the setting unit 42 calculates the traveling resistance DR from the traveling driving force RF, the actual acceleration VA, and the acceleration sensor correction value GS', which are vehicle information, and the air resistance AR. The setting unit 42 may calculate the air resistance AR from the vehicle speed CV. The setting unit 42 may calculate a shift point based on the calculated traveling resistance DR. For example, the setting unit 42 may set the shift point based on the traveling resistance DR, the maximum driving force line showing the maximum value of the driving force DF output by the driving source 12 shown in FIG. 6, and the point determination line. For example, the setting unit 42 may set a point determination line along which the traveling resistance DR is shifted upward and use an intersection point between the point determination line and the maximum driving force line as a shift point. The maximum driving force line may be stored in the storage unit 36 as a part of the numerical data 46 in advance.

Figure 16:
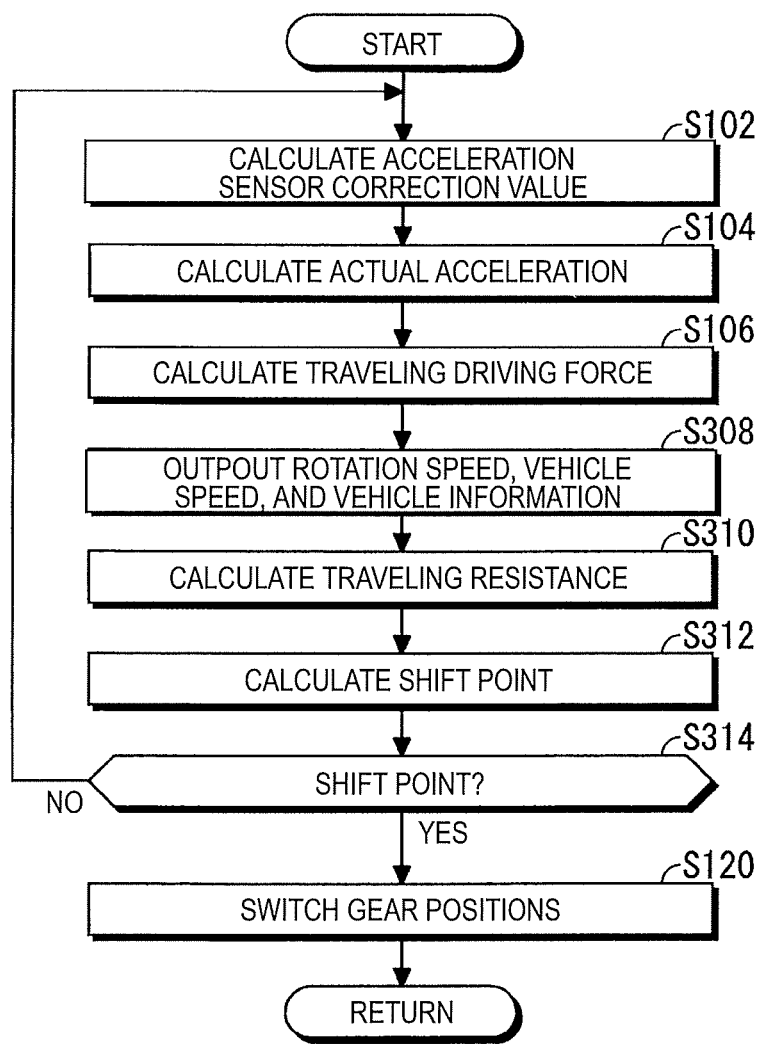
FIG. 16 is a flowchart of a speed control processing according to a sixth embodiment executed by the processing unit.

FIG. 16 is a flowchart of the speed control processing according to the sixth embodiment executed by the processing unit 34. The same step numerals will be assigned to the steps same as those in the above embodiments and the descriptions will be omitted or simplified.

As shown in FIG. 16, in the speed control processing according to the sixth embodiment, the vehicle information output unit 40 executes the steps S102, S104, and S106, and calculates or obtains the vehicle information including the acceleration sensor value GS, the actual acceleration VA, and the traveling driving force RF. The vehicle information output unit 40 outputs the rotation speed RS, the vehicle speed CV, and the vehicle information to the setting unit 42. (S308).

The setting unit 42 calculates the traveling resistance DR based on the air resistance AR calculated from the vehicle speed CV and the vehicle information (S310). The setting unit 42 calculates the shift point based on the traveling resistance DR, the maximum driving force line of the driving source 12 shown in FIG. 6, and the traveling resistance DR (S312). Based on the throttle opening degree shown by the opening degree information and the rotation speed RS, the setting unit 42 determines whether or not the shift point is reached. When it is determined that the shift point is not reached (S314: No), the setting unit 42 repeats the step S102 onward. When it is determined that the shift point is reached (S314: Yes), the setting unit 42 repeats the step S102 onward after switching the gear positions of the automatic transmission 14 (S120).

As described above, the speed control device 30 according to the sixth embodiment sets the shift point based on the traveling resistance DR that can be calculated even if the vehicle weight CM is unknown. In this way, the speed control device 30 can appropriately set the shift point even in the vehicle 10, like a pick-up truck, of which the vehicle weight CM varies greatly.

The functions, connection relationships, number, arrangement, and the like of the configurations of the respective embodiments described above may be modified or deleted within the scope disclosed here and the scope equivalent to the scope disclosed here as deemed appropriate. Each embodiment may be combined as deemed appropriate. The order of each step of each embodiment may be modified as deemed appropriate.

In the embodiments described above, examples in which the vehicle information output unit 40 obtains the acceleration sensor value GS, the vehicle speed information, and the opening degree information from the sensors 24, 26, and 28 provided in the vehicle 10 are presented, but the vehicle information output unit 40 may obtain the above information from an external sensor or the like.

In the embodiments described above, examples in which the setting unit 42 calculates the actual acceleration VA, the traveling driving force RF, and the like in the embodiment described above are presented, but the setting unit 42 may obtain the actual acceleration VA, the traveling driving force RF, and the like from an external information processing device or the like.

In the first embodiment and the second embodiment described above, the speed control device 30 selecting a shift mode from two shift modes by one selection threshold is presented, but the speed control device 30 may select a shift mode from three or more shift modes by two or more selection thresholds even in the first embodiment and the second embodiment.

In the expressions (5) and (10) described above serving as the motion equations of the vehicle 10, a loss of the driving force DF occurring while the driving force DF runs from the driving source 12 to the wheel 20 may be taken into consideration.

In the embodiments described above, the acceleration sensor correction value GS' is used as the vehicle information, but the acceleration sensor value GS may be used as the vehicle information. In this case, the acceleration sensor value GS is an example of the measurement information.

In the embodiments described above, an example in which the vehicle information output unit 40 outputs the acceleration sensor correction value GS', the actual acceleration VA, and the traveling driving force RF as the vehicle information, is presented, but the vehicle information is not limited thereto. In the first embodiment to the fifth embodiment described above, the vehicle information output unit 40 may output at least two of the acceleration sensor correction value GS', the actual acceleration VA, and the traveling driving force RF. For example, in the first embodiment, the vehicle information output unit 40 may output the two of the accelerations sensor correction value GS' and the actual acceleration VA as the vehicle information. In this case, the setting unit 42 may select the shift mode by setting the selection threshold as a straight a line on a two-dimensional flat plane with the acceleration sensor correction value GS' and the actual acceleration VA as the two axes. In the second embodiment, the vehicle information output unit 40 may output the two of the acceleration sensor correction value GS' and the traveling driving force RF as the vehicle information. In this case, the setting unit 42 may select the shift mode by setting the selection threshold as a straight line on a two-dimensional flat plane with the acceleration sensor correction value GS' and the traveling driving force RF as the two axes.

In the embodiments described above, the selection threshold is an example, and the selection threshold may be set by other elements. For example, the selection threshold may be set such that the gradient resistance GR (=CM*g*sin θ) is constant.

In the above fifth embodiment in which the braking force BF is taken into consideration, an example where the shift mode is selected based on the selection threshold when the sum of the gradient resistance GR and the rolling resistance RR is constant like in the fourth embodiment is presented, but the selection method of the shift mode with the braking force BF taken into consideration is not limited to the method according to the fifth embodiment. For example, in the first embodiment to the third embodiment, the shift mode may be selected based on the selection threshold when at least either the gradient of the road surface or the vehicle weight CM is constant.

Modification Example

A modification example will be described in the following.

In the device in the related art described above, when a vehicle is inclined due to cargo or the like, the acceleration sensor mounted in the vehicle is inclined with respect to the road surface and direction changes such that the device described above cannot accurately calculate the forward/backward acceleration. Thus, a configuration is desired in which calculation accuracy of the acceleration can be improved even when the vehicle is inclined with respect to the road surface due to cargo.

In order to solve this problem, it is desirable to have an output unit that outputs the acceleration sensor value according to the forward/backward acceleration of the vehicle measured by the acceleration sensor and the traveling driving force based on the driving force of the driving source of the vehicle and the air resistance acting on the vehicle, and to have a configuration in which the correction value, by which the acceleration sensor value is corrected, is calculated based on a plurality of the acceleration sensor values and a plurality of the traveling driving forces, the acceleration sensor value is corrected based on the correction value, and the acceleration is calculated.

By the above configuration, the acceleration sensor value measured by the acceleration sensor, of which the direction of measuring the acceleration is inclined due to the inclination of the vehicle and an assembling error of the acceleration sensor, is corrected based on the correction value calculated from the plurality of acceleration sensor values and the plurality of traveling driving forces, and the forward/backward acceleration of the vehicle is calculated. In this way, it is possible to improve the calculation accuracy of the acceleration even when the vehicle is inclined with respect to the road surface due to cargo or the like.

A specific configuration will be described in the following. In order to realize the configuration described above, it is possible to replace the speed control system 22 with an acceleration calculation system and the speed control device 30 with an acceleration calculation device in the entire configuration of the system shown in FIG. 2.

The acceleration calculation system calculates the acceleration of the vehicle 10. The acceleration calculation system may control the automatic transmission 14 based on the calculated acceleration. The acceleration calculation system has the acceleration sensor 24, the vehicle speed sensor 26, the opening degree sensor 28, the braking sensor 29, and the acceleration calculation device.

Further, the acceleration calculation device may calculate the correction value for correcting the acceleration sensor value, correct the acceleration sensor value based on the correction value, and calculate the forward/backward acceleration of the vehicle 10.

In the system block diagram shown in FIG. 3, the processing unit 34 and the storage unit 36 are included.

The processing unit 34 is realized as a function of a CPU 30a, for example. The processing unit 34 functions as the output unit and the calculation unit. For example, the processing unit 34 functions as the output unit and the calculation unit by reading the program stored in the storage unit 36.

The vehicle information output unit 40 obtains or calculates the information for correcting the acceleration sensor value detected by the acceleration sensor 24 and calculating the acceleration and outputs the acceleration to the setting unit 42. For example, the vehicle information output unit 40 obtains the acceleration sensor value from the acceleration sensor 24 and outputs the acceleration sensor value to the setting unit 42. The vehicle information output unit 40 repeatedly calculates the traveling driving force based on the driving force of the driving source 12 and the air resistance acting on the vehicle 10 and outputs the traveling driving force to the setting unit 42.

The setting unit 42 calculates the correction value by which the acceleration sensor value is corrected based on a plurality of acceleration sensor values and a plurality of the traveling driving forces obtained from the vehicle information output unit 40, corrects the acceleration sensor value based on the correction value, and calculates the backward/forward acceleration of the vehicle 10. For example, a linear expression showing a relationship between the acceleration sensor value and the traveling driving force is calculated in a state (hereinafter, inclination state) where the vehicle 10 is inclined with respect to the road surface due to the loading of cargo or the like. A reference value in a state (hereinafter, reference state) where almost no cargo is loaded and the vehicle 10 is not inclined with respect to the road surface and a correction value, based on a difference from the y intercept of the linear expression in the inclination state, are calculated. The reference value will be described below. The setting unit 42 may correct the acceleration sensor value based on the correction value, calculate the forward/backward acceleration (hereinafter, corrected acceleration) of the vehicle 10 and output the corrected acceleration to the control unit that controls the automatic transmission 14.

Figure 17:
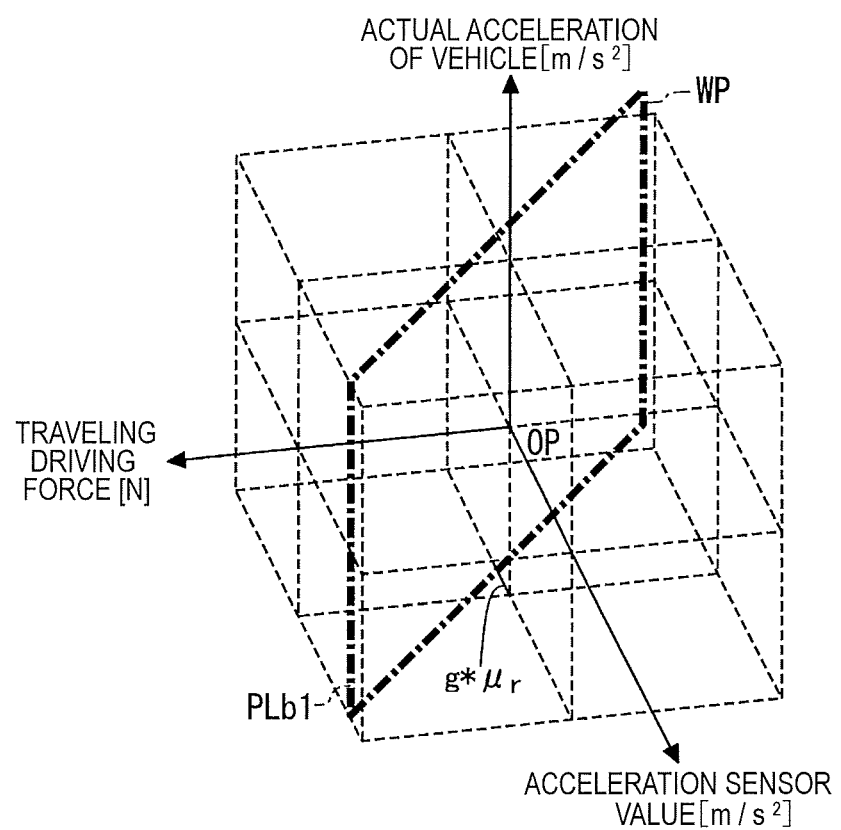
FIG. 17 is a view for describing a relationship between the acceleration sensor value and the traveling driving force when weight of a vehicle is the same.

FIG. 17 is a figure for describing a relationship between the acceleration sensor value and the traveling driving force when the weight of the vehicle 10 is the same.

As shown in FIG. 17, the three axes represent the values of the traveling driving force, the acceleration sensor value, and the actual acceleration of the vehicle 10. The actual acceleration of the vehicle 10 is the forward/backward acceleration of the vehicle 10 obtained by differentiating the vehicle speed information from the vehicle speed sensor 26, which is the output rotation of the output shaft 14a of the automatic transmission 14. In this case, when the weight of the vehicle 10 is the same, the relationship between the traveling driving force and the acceleration sensor value is represented by a flat plane (hereinafter, equal vehicle weight plane WP) denoted by the one-dot chain line. Here, since the equal vehicle weight plane WP is parallel to the coordinate axis of the actual acceleration of the vehicle 10, the equal vehicle weight plane WP can be represented in two dimensions that include the traveling driving force and the acceleration sensor value. At the origin, the equal vehicle weight plane WP is offset by $g*\mu_r$ in the negative direction of the acceleration sensor value. g is gravity acceleration and $\mu_r$ is a rotating coefficient.

Figure 18:
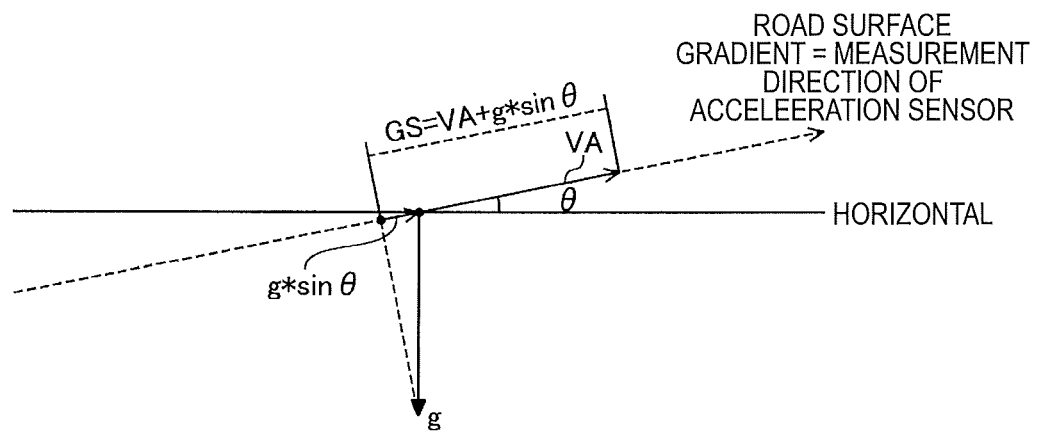
FIG. 18 is a view showing the acceleration sensor value in a reference state where the vehicle is not inclined with respect to a road surface.
Figure 19:
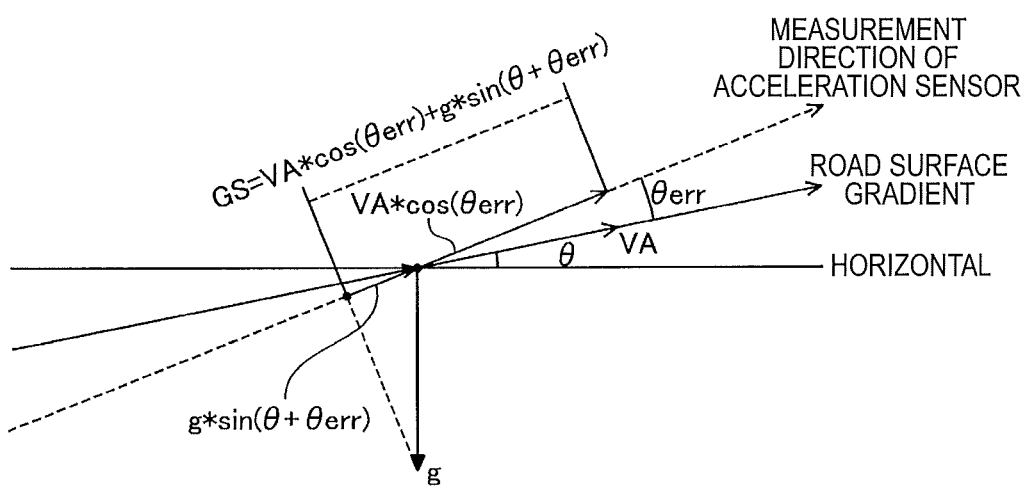
FIG. 19 is a view showing the acceleration sensor value in an inclination state where the vehicle is inclined with respect to the reference state of FIG. 18.

Next, the correction and calculation of the acceleration of the vehicle 10 in the processing unit 34 will be described. FIG. 18 is a view showing the acceleration sensor value GS in the reference state where the vehicle 10 is not inclined with respect to the road surface. FIG. 19 is a view showing the acceleration sensor value GS in the inclination state where the vehicle 10 is inclined, as opposed to the reference state of FIG. 18. It is assumed that the weight of the vehicle 10 does not change during the traveling over a short period of time when the correction value is calculated. That is, it is assumed that the weight of the vehicle 10 does not change and that the traveling driving force RF in each state in FIGS. 18 and 19 and the acceleration sensor value GS satisfy the relationship of the equal vehicle weight plane WP shown in FIG. 17.

It is assumed that the vehicle 10 is traveling on a road surface inclined by a road surface inclination angle θ in the vertical direction with respect to the horizontal direction. In this case, as shown in FIG. 18, the acceleration sensor value GS of the vehicle 10 in the reference state during the traveling on the road surface with the road surface inclination angle θ becomes VA+g*sin θ, where VA is the actual acceleration VA and g*sin θ is a component of the gravity acceleration g along the road surface. The motion equation of the vehicle 10 can be expressed by the following expression (18) shown below. (DF−BF−AR) on the left side of the following expression (18) is the traveling driving force RF. The output unit 40 may obtain the driving force DF from a driving force characteristic previously associated with the opening degree of the throttle valve (or opening degree of the accelerator), the rotation speed of the output shaft 14a, and the like. The driving force characteristic may be stored in the storage unit 36 as a part of the numerical data 46 in advance.

$$(DF-BF-AR)-RW*g*\sin\theta-RW*g*\mu_r = RW*VA \rightarrow DF-BF-AR=RW*(VA+g*\sin\theta+g*\mu) \quad (18)$$

where
DF: the driving force of the driving source of the vehicle 10
BF: the braking force by the brake of the vehicle 10
AR: air resistance (=λ*S*VV²)
λ: resistance coefficient of air
S: area of the vehicle 10 (for example, longitudinal section area)
VV: speed of the vehicle 10
RW (=CM): weight of the vehicle 10.

Except when the brake is being operated, the braking force BF may be "zero".

Otherwise, the output unit 40 may calculate the braking force BF from the position information detected by the braking sensor 29.

The above expression (18) is modified into the following expression (19).

$$VA+g*\sin\theta = (DF-BF-AR)/RW \ g*\mu_r \quad (19)$$

Here, when the traveling driving force RF (=DF−BF−AR) is set to be x1 and the acceleration sensor value GS(=VA+g*sin θ) is set to be y1, the above expression (19) becomes the following expression (20).

$$y1=RW^{-1}*x1-g*\mu_r \quad (20)$$

Further, a modification of expression (19) yields the actual acceleration VA in the following expression (21).

$$VA=(DF-BF-AR)/RW(g*+g*\sin\theta) \quad (21)$$

Next, as shown in FIG. 19, in the inclination state where the vehicle 10 is further inclined at an inclination angle θ, from the road surface gradient angle θ due to the loading of cargo, the actual acceleration VA acting on the acceleration sensor 24 in the measurement direction becomes VA*cos θ_{err}, and the gravity acceleration g acting on the acceleration sensor 24 in the measurement direction becomes g*sin (θ+f_{err}). Therefore, the acceleration sensor value GS of the acceleration sensor 24 becomes VA*cos θ_{err}+g*sin (θ+θ_{err}). Substitution of the actual acceleration VA in the expression (21) into the acceleration sensor value GS yields the following expression (22).

$$VA*\cos\theta_{err}+g*\sin(\theta+\theta_{err})=[(DF-BF-AR)/RW-(g*\mu_r+g*\sin\theta)]*\cos\theta_{err}g*\sin(\theta+\theta_{err})=[(DF-BF-AR)/RW]*\cos\theta_{err}-[(g*\mu_r+g*\sin\theta)]*\cos\theta_{err}+g*\sin(\theta+\theta_{err}) \quad (22)$$

Here, when the traveling driving force RF (=DF−BF−AR) is set to be x2 and the acceleration sensor value GS(=VA*cos θ_{err}+g*sin (θ+θ_{err})) is set to be y2, the expression (22) becomes the following expression (23).

$$y2=\cos\theta_{err}*RW^{-1}*x2-g*\mu_r*\cos\theta_{err}-g*\sin\theta*\cos\theta_{err}+g*\sin(\theta+\theta_{err}) \quad (23)$$

Here, since the road surface gradient angle θ and the inclination angle θ_{err} are small values, the values are approximated by the following expressions (24a) and (24b).

$$\cos\theta_{err} \approx 1 \quad (24a)$$

$$\sin(\theta+\theta_{err}) \approx \sin\theta+\sin\theta_{err} \quad (24b)$$

Substitution in the expressions (24a) and (24b) into the expression (23) yields the expression (25).

$$y2=RW^{-1}*x2g*\mu_r+g*\sin\theta_{err} \quad (25)$$

Figure 20:
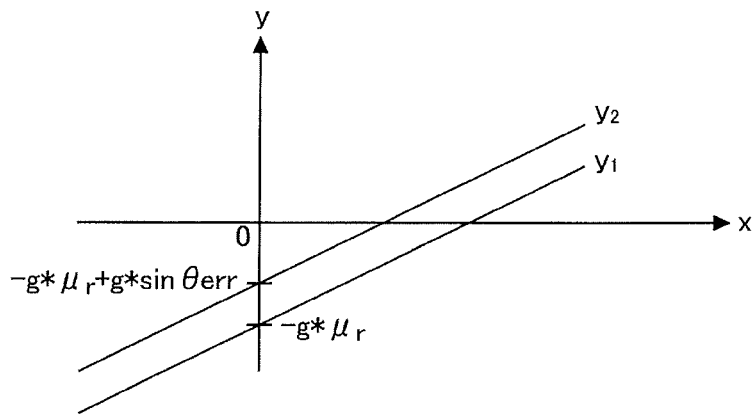
FIG. 20 is a graph showing a relationship between x and y in the reference state and the inclination state.

FIG. 20 is a graph showing a relationship between x and y in the reference state and the inclination state. y is the acceleration sensor value GS and x is the traveling driving force RF.

The linear expression showing the relationship between x1 and y1 in the reference state and the linear expression showing the relationship between x2 and y2 in the inclination state can be expressed by the straight lines shown in FIG. 20. Here, since y1 and y2 on the left side of the above expressions (20) and (25) represent the acceleration sensor value GS in each state, presence or absence of the inclination angle θ_{err} of the posture of the acceleration sensor 24 generates a difference in the y intercepts of y1 and y2 in the expressions (20) and (25). That is, the difference between the y intercept in the expression (20) and the y intercept in the expression (25) is the error caused by the inclination angle θ_{err}. Therefore, the setting unit 42 may calculate the difference between the y intercept in the expression (20) and the y intercept in the expression (25) as the correction value CV by which the error of the acceleration sensor value GS caused by the inclination angle θ_{err} is corrected.

Specifically, in a state where the vehicle 10 is inclined at the inclination angle θ_{err} with respect to the road surface, the vehicle information output unit 40 samples the traveling driving force RF which is the value of y2 and the acceleration sensor value GS which is the value of x2 in every predetermined sampling period and output the traveling driving force RF and the acceleration sensor value GS to the calculation unit 42. It is preferable that the vehicle information output unit 40 samples not only during acceleration during which the accelerator pedal is operated but in a state where the accelerator brake is not operated in order to improve the calculation accuracy of the acceleration. The setting unit 42, functioning as the calculation unit, substitutes the sampled values of a plurality of x2s and y2s into the expression (25) and calculates the inclination and the y intercept. For example, the setting unit 42 may calculate the inclination and the y intercept by the least square method or the like that uses the sample values of the plurality of x2s and y2s.

The setting unit 42 may calculate the difference between the y intercept in the above expression (20) and the y intercept in the expression (25) as the correction value CV. Here, since g*μ, which is the value of y intercept in the expression (20), is a constant independent of the inclination angle θ$_{err}$, or the like, it may be stored in the storage unit 36 as a part of the numerical data 46 in advance. g*μ$_r$ is the reference value described above. The calculation unit 42 may calculate the correction value CV by the following expression (26).

$$CV = -(y_{O2} - g^*\mu_r) \quad (26)$$

where y$_{O2}$: y intercept of y2.

The setting unit 42 corrects the acceleration sensor value GS by the correction value CV and calculates the acceleration of the vehicle 10. Specifically, when the corrected acceleration is used as the corrected acceleration CA, the calculation unit 42 may calculate the corrected acceleration CA based on the following expression (26).

$$CA = GS - CV \quad (27)$$

Next, the difference between when an approximation is performed by the expressions (24a) and (24b) and when the approximation is not performed will be described. The road surface gradient according to the road surface gradient angle θ is set to 2%, and the sum of the road surface gradient angle θ and the inclination angle θ$_{err}$ is set to 0.02991 rad. 0.02991 rad is equivalent to 3% in the case of the road surface gradient. In this case, the correction values CV when the approximation is performed and when the approximation is not performed are as follows. In this way, it is found that the effect of the approximation on the correction value CV is small.

Correction value CV when the approximation is not performed: 0.293809

Correction value CV when the approximation is performed: 0.293867

Figure 21:
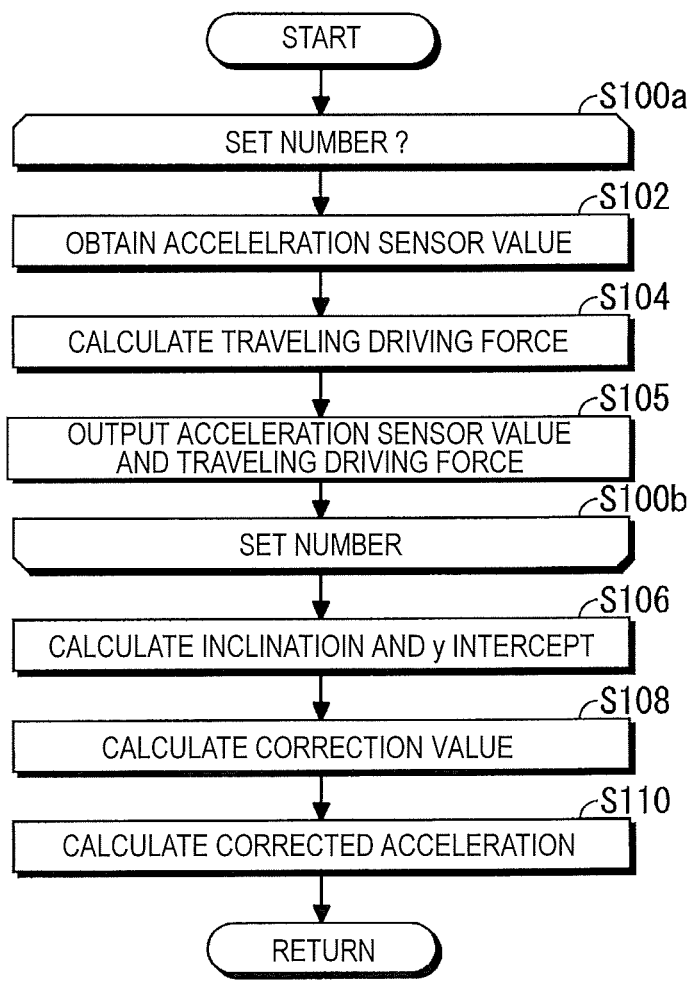
FIG. 21 is a flowchart of an acceleration calculation processing executed by the processing unit.

FIG. 21 is a flowchart of the acceleration calculation performed by the processing unit 34.

In the acceleration calculation process shown in FIG. 21, the vehicle information output unit 40 obtains and outputs the acceleration sensor value GS (S102) and calculates the traveling driving force RF (S104). For example, the vehicle information output unit 40 calculates the traveling driving force RF based on the expression (18) which includes the difference between the driving force DF of the driving source 12 and the air resistance AR and outputs the acceleration sensor value GS and the traveling driving force RF to the calculation unit 42 (S105). S102 and S104 are executed for a set number of times which is preset (S100a, S100b), a plurality of acceleration sensor values GSs and a plurality of the traveling driving forces RFs are calculated and output to the setting unit 42. The set number may be preset and stored in the storage unit 36 as a part of the numerical data 46.

The calculation unit 42 calculates the inclination and the y intercept in the expression (25) based on the plurality of traveling driving forces RFs and the plurality of acceleration sensor values GSs (S106). Once S102 and S104 are executed for a preset number of times, the calculation unit 42 may execute the step S106 onward each time S102 and S104 are executed.

The setting unit 42 calculates the correction value CV of the acceleration sensor value GS based on the expression (26) which uses g*μ$_r$ which is the calculated y intercept in the expression (25) and y intercept in the expression (20) (S108). After calculating the corrected acceleration CA based on the expression (27) which uses the calculated correction value CV and the acceleration sensor value GS (S110), the calculation unit 42 repeats the step S102 onward.

As described above, by correcting the acceleration sensor value GS that changes in accordance with the inclination of the vehicle 10 based on the correction value CV calculated from the plurality of acceleration sensor values GSs and the plurality of the traveling driving forces RFs and calculating the corrected acceleration CA, the acceleration calculation device 30 can improve the calculation accuracy of the forward/backward acceleration, calculated from the acceleration sensor value GS, of the vehicle 10 even when the vehicle 10 is inclined due to cargo or the like.

APPENDIX

The configuration may be such that the acceleration sensor value according to the forward/backward acceleration of the vehicle measured by the acceleration sensor and the traveling driving force based on the driving force of the driving source of the vehicle and the air resistance acting on the vehicle are output, the correction value by which the acceleration sensor value is corrected based on a plurality of the acceleration sensor values and a plurality of the traveling driving forces is calculated, the acceleration sensor value is corrected based on the correction value, and the acceleration is calculated.

By the above configuration, the acceleration sensor value measured by the acceleration sensor, of which the direction of measuring the acceleration is inclined by the inclination of the vehicle, an error in the assembling of the acceleration sensor, or the like, is corrected based on the correction value calculated from the plurality of acceleration sensor values and the plurality of traveling driving forces, and the forward/backward acceleration of the vehicle is calculated. In this way, it is possible to provide a speed control device configured to improve the calculation accuracy of the acceleration even when the vehicle is inclined with respect to the road surface due to cargo or the like and to set the shift point appropriately according to the situation of the vehicle.

This disclosure provides a speed control device configured to set a shift point appropriately according to a situation of a vehicle.

A speed control device according to an aspect of this disclosure includes a vehicle information output unit that outputs at least two, as vehicle information, of measurement information on forward/backward acceleration of a vehicle measured by an acceleration sensor, forward/backward actual acceleration of the vehicle obtained from an output rotation of an automatic transmission, and a traveling driving force based on a driving force output by a driving source and an air resistance acting on the vehicle; and a setting unit that selects a shift mode by comparing the vehicle information with a predetermined selection threshold and sets a shift point for controlling the automatic transmission provided in the vehicle based on the shift mode.

Accordingly, the speed control device according to the aspect of this disclosure selects a shift mode by comparing vehicle information that changes in accordance with a situation of a vehicle with the selection threshold and controls an automatic transmission in accordance with a shift point based on the shift mode. In this way, the speed control device automatically selects the shift mode independently of an occupant such as a driver and can control the automatic transmission at an appropriate shift point according to the shift mode even if the situation of the vehicle changes.

In the speed control device according to the aspect of this disclosure, the setting unit may select the shift mode by comparing the selection threshold according to a gradient of a road surface during a traveling of the vehicle with the vehicle information.

Accordingly, the speed control device according to the aspect of this disclosure selects the shift mode based on the selection threshold according to the gradient of the road surface. In this way, the speed control device can select a shift mode appropriate for the gradient of the road surface including an uphill, levelness, and a downhill based on the comparison between the selection threshold and the vehicle information.

In the speed control device according to the aspect of this disclosure, the setting unit may select the shift mode by comparing the selection threshold according to a vehicle weight which is a weight of the vehicle with the vehicle information.

Accordingly, the speed control device according to the aspect of this disclosure selects the shift mode based on the selection threshold according to the vehicle weight. In this way, based on the comparison between the selection threshold and the vehicle information, the speed control device can select a shift mode appropriate for the vehicle weight that varies depending on loading of cargo or towing of a towed vehicle.

In the speed control device according to the aspect of this disclosure, the setting unit may select the shift mode by comparing the selection threshold according to the gradient of the road surface during the traveling of the vehicle and the vehicle weight which is the weight of the vehicle with the vehicle information.

Accordingly, since the speed control device according to the aspect of this disclosure sets the shift mode by comparing the selection threshold according to the gradient of the road surface and the vehicle weight with the vehicle information, the speed control device can set the shift mode appropriate for both the gradient of the road surface and the vehicle weight.

In the speed control device according to the aspect of this disclosure, the setting unit may select the shift mode by comparing the selection threshold according to a traveling resistance determined from the vehicle weight and the gradient of the road surface during the traveling of the vehicle with the vehicle information.

Accordingly, the speed control device according to the aspect of this disclosure selects a shift mode in accordance with the selection threshold according to the traveling resistance. In this way, the speed control device can select a shift mode appropriate for the traveling resistance based on the selection threshold.

In the speed control device according to the aspect of this disclosure, the setting unit may select the shift mode by comparing the selection threshold according to a sum of a gradient resistance received from the gradient of the road surface during traveling of the vehicle and a rolling resistance received from the road surface with the vehicle information.

Accordingly, the speed control device according to the aspect of this disclosure selects a shift mode in accordance with the selection threshold according to the sum of the gradient resistance and the rolling resistance. In this way, the speed control device can select a shift mode appropriate for the sum of the gradient resistance and the rolling resistance based on the selection threshold.

A speed control device according to another aspect of this disclosure includes a vehicle information output unit that outputs, as vehicle information, measurement information on forward/backward acceleration of a vehicle measured by an acceleration sensor, forward/backward actual acceleration of the vehicle obtained from an output rotation of an automatic transmission, and a traveling driving force based on a driving force output by a driving source and an air resistance acting on the vehicle; and a setting unit that calculates traveling resistance from the vehicle information and sets a shift point for controlling the automatic transmission provided in the vehicle based on the traveling resistance.

Accordingly, the speed control device according to the aspect of this disclosure sets a shift point based on the traveling resistance that can be calculated even if the vehicle weight is unknown. In this way, the speed control device can set a shift point appropriate even for a vehicle of which the vehicle weight varies greatly.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A speed control device comprising:
   a vehicle information output unit that outputs at least two, as vehicle information, of measurement information on forward/backward acceleration of a vehicle measured by an acceleration sensor, forward/backward actual acceleration of the vehicle obtained from an output rotation of an automatic transmission, and a traveling driving force calculated by subtracting an air resistance acting on the vehicle from a driving force output by a driving source; and
   a setting unit that selects a shift mode by comparing the vehicle information with a predetermined selection threshold and sets a shift point for controlling the automatic transmission provided in the vehicle based on the shift mode,
   wherein the setting unit selects the shift mode by comparing the selection threshold according to a vehicle weight which is a weight of the vehicle with the vehicle information.

2. A speed control device according to claim 1 comprising:
   a vehicle information output unit that outputs at least two, as vehicle information, of measurement information on forward/backward acceleration of a vehicle measured by an acceleration sensor, forward/backward actual acceleration of the vehicle obtained from an output rotation of an automatic transmission, and a traveling driving force calculated by subtracting an air resistance acting on the vehicle from a driving force output by a driving source; and
   a setting unit that selects a shift mode by comparing the vehicle information with a predetermined selection threshold and sets a shift point for controlling the automatic transmission provided in the vehicle based on the shift mode, wherein the setting unit selects the shift mode by comparing the selection threshold according to a traveling resistance determined from a vehicle weight and a gradient of a road surface during traveling of the vehicle with the vehicle information.

3. A speed control device, comprising:

a vehicle information output unit that outputs an acceleration sensor value based on forward/backward acceleration of a vehicle measured by an acceleration sensor, and a traveling driving force calculated by subtracting an air resistance acting on the vehicle from a driving force of a driving source of the vehicle, and a setting unit that determines a relationship between a plurality of the acceleration sensor values and a plurality of the traveling driving forces, and corrects the acceleration sensor value by a difference between the relationship and a reference relationship.

* * * * *